United States Patent
Masuko et al.

(10) Patent No.: US 9,401,023 B2
(45) Date of Patent: Jul. 26, 2016

(54) CLOTHING IMAGE PROCESSING SYSTEM, CONTROL METHOD FOR CLOTHING IMAGE PROCESSING SYSTEM, CLOTHING IMAGE PROCESSING DEVICE, CONTROL METHOD FOR CLOTHING IMAGE PROCESSING DEVICE, PROGRAM, AND INFORMATION RECORDING MEDIUM

(71) Applicant: Rakuten, Inc., Shinagawa-ku, Tokyo (JP)

(72) Inventors: Soh Masuko, Tokyo (JP); Ryuji Sakamaki, Tokyo (JP); Myagmarsuren Shirmenbaatar, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 14/375,428

(22) PCT Filed: Oct. 1, 2012

(86) PCT No.: PCT/JP2012/075429
§ 371 (c)(1),
(2) Date: Jul. 29, 2014

(87) PCT Pub. No.: WO2013/114673
PCT Pub. Date: Aug. 8, 2013

(65) Prior Publication Data
US 2015/0003690 A1   Jan. 1, 2015

(30) Foreign Application Priority Data
Jan. 30, 2012   (JP) .................................. 2012-016614

(51) Int. Cl.
*G06K 9/00* (2006.01)
*G06T 7/00* (2006.01)
(Continued)

(52) U.S. Cl.
CPC ................ *G06T 7/004* (2013.01); *G06Q 30/06* (2013.01); *G06T 3/40* (2013.01); *G06T 11/60* (2013.01); *G06T 2207/30124* (2013.01)

(58) Field of Classification Search
None
See application file for complete search history.

(56) References Cited

U.S. PATENT DOCUMENTS 5,850,222 A * 12/1998 Cone .................. G06T 17/20
345/418
6,307,568 B1   10/2001 Rom
(Continued)

FOREIGN PATENT DOCUMENTS

JP   2005-027951 A   2/2005
JP   2006-135846 A   5/2006
(Continued)

OTHER PUBLICATIONS

Lisa Fretwell. "How New Consumer Behaviors Are Enabling Retailers to Revitalize Their Stores by Combining the Virtual and Physical Worlds" CISCO , IBSG. 2011.*
(Continued)

*Primary Examiner* — Bhavesh Mehta
*Assistant Examiner* — Oneal R Mistry
(74) *Attorney, Agent, or Firm* — Hubbs, Enatsky & Inoue PLLC

(57) ABSTRACT

A first size adjusting unit adjusts a size of a first clothing image which is an image of a first piece of clothing worn on an upper half of a body based on a width of a shoulder part of the first piece of clothing in the first clothing image. A second size adjusting unit adjusts a size of a second clothing image which is an image of a second piece of clothing worn on a lower half of a body based on a width of a waist part of the second piece of clothing in the second clothing image. A display control unit causes a display to display a screen on which the first piece of clothing and the second piece of clothing are vertically displayed, based on the first clothing image and the second clothing image.

18 Claims, 16 Drawing Sheets

(51) Int. Cl.
  *G06Q 30/06* (2012.01)
  *G06T 11/60* (2006.01)
  *G06T 3/40* (2006.01)

(56) References Cited

U.S. PATENT DOCUMENTS

| | | | |
|---|---|---|---|
| 8,525,828 B1* | 9/2013 | Bates | G06T 15/00 345/419 |
| 8,976,230 B1* | 3/2015 | Vendrow | H04N 5/76 348/46 |
| 2008/0215453 A1 | 9/2008 | Yoshii | |
| 2011/0119148 A1 | 5/2011 | Yoshii | |
| 2011/0142335 A1* | 6/2011 | Ghanem | G06F 17/3025 382/165 |
| 2011/0268320 A1* | 11/2011 | Huang | G06K 9/00718 382/103 |
| 2012/0022978 A1 | 1/2012 | Manea | |

FOREIGN PATENT DOCUMENTS

| | | |
|---|---|---|
| JP | 2006-135876 A | 5/2006 |
| JP | 2006-155148 A | 6/2006 |
| JP | 2008-217320 A | 9/2008 |
| JP | 2010-074217 | 4/2010 |

OTHER PUBLICATIONS

The partial translation of Office Action for corresponding Japanese Patent Application No. 2012-016614 dated Aug. 26, 2014.
Stephen Miller et al: "Parametrized shape models for clothing", Robotics and Automation (ICRA), 2011 IEEE International Conference on, IEEE, May 9, 2011, pp. 4861-4868, XP032034273, DOI: 10.1109/ICRA.2011.5980453 ISBN: 978-1-61284-386-5.
English translation of International Search Report for PCT/JP2012/075429 dated Dec. 18, 2012.
Partial translation of the office action for Japanese patent application No. 2014-218623 (mailing date: Dec. 2, 2014).

* cited by examiner

FIG.2

| STORE ID | NAME | ADDRESS | URL |
|---|---|---|---|
| S001 | --- | --- | --- |
| S002 | --- | --- | --- |
| S003 | --- | --- | --- |
| ... | ... | ... | ... |

FIG.3

| ITEM ID | STORE | NAME | CATEGORY | | PRICE | STOCK | URL |
| | | | MAIN | SUB | | | |
|---|---|---|---|---|---|---|---|
| T001 | S001 | --- | TOP WEAR | T-SHIRTS | --- | --- | --- |
| T002 | S001 | --- | TOP WEAR | CARDIGANS | --- | --- | --- |
| T003 | S001 | --- | BOTTOM WEAR | SKIRTS | --- | --- | --- |
| T004 | S001 | --- | BOTTOM WEAR | SKIRTS | --- | --- | --- |
| ... | ... | ... | ... | ... | ... | ... | ... |

| IMAGE ID | ITEM | URL | SIZE ADJUSTMENT LINE | POSITION ADJUSTMENT LINE |
|---|---|---|---|---|
| P001 | T001 | --- | --- | --- |
| P002 | T002 | --- | --- | --- |
| P003 | T003 | --- | --- | --- |
| P004 | T004 | --- | --- | --- |
| ... | ... | ... | ... | ... |

CLOTHING IMAGE PROCESSING SYSTEM, CONTROL METHOD FOR CLOTHING IMAGE PROCESSING SYSTEM, CLOTHING IMAGE PROCESSING DEVICE, CONTROL METHOD FOR CLOTHING IMAGE PROCESSING DEVICE, PROGRAM, AND INFORMATION RECORDING MEDIUM

CROSS REFERENCE TO RELATED APPLICATIONS

This application is a National Stage of International Application No. PCT/JP2012/075429 filed Oct. 1, 2012, claiming priority based on Japanese Patent Application No. 2012-016614 filed on Jan. 30, 2012. The contents of each of the above documents are incorporated herein by reference in their entirety.

TECHNICAL FIELD

The present invention relates to a clothing image processing system, a method of controlling a clothing image processing system, a clothing image processing device, a method of controlling a clothing image processing device, a program, and an information recording medium.

BACKGROUND ART

An increasing number of users are using electronic commerce to purchase fashion-related items in recent years. In many sites that sell fashion-related items, clothing images are displayed in a list format, as is the case for commercial goods of other genres. In some of sites that sell fashion-related items, a photographed image of a person or mannequin wearing a combination of pieces of clothing (for example, a combination of a top wear and a bottom wear) selected by the seller is displayed. A "top wear" is a piece of clothing worn on the upper half of the body, and a "bottom wear" is a piece of clothing worn on the lower half of the body.

CITATION LIST

Patent Literature

[Patent Literature 1] JP 2008-217320 A

SUMMARY OF INVENTION

Technical Problem

Users who uses electronic commerce to purchase fashion-related items wish to check various clothing combinations (coordinates) while shopping. This wish could be fulfilled by, for example, displaying a top wear image and a bottom wear image one above the other on the screen so that various combinations (coordinates) of a top wear and a bottom wear are presented to users.

However, many clothing images are photographed in a manner that gives as large a view as possible of a piece of clothing that is the subject of the photographed image, and the size (scale) of the piece of clothing in the image consequently varies from one clothing image to another, depending on the shape and the like of the piece of clothing. Therefore, when a top wear image and a bottom wear image are simply displayed one above the other on the screen, the balance between the sizes (scales) of the top wear and the bottom wear displayed on the screen may differ significantly from the balance between the actual sizes of the top wear and the bottom wear, thereby giving a sense of strangeness to users.

The present invention has been made in view of the problem described above, and an object of the present invention is therefore to provide a clothing image processing system, a method of controlling a clothing image processing system, a clothing image processing device, a method of controlling a clothing image processing device, a program, and an information recording medium with which, on a screen on which a combination of a top wear image and a bottom wear image is displayed, for example, the balance between the sizes (scales) of the top wear and the bottom wear is made closer to the balance between the actual sizes of the top wear and the bottom wear.

Solution to Problem

In order to solve the above-mentioned problem, a clothing image processing system according to one embodiment of the present invention is a clothing image processing system, including: first clothing image obtaining means for obtaining a first clothing image which is an image of a first piece of clothing worn on an upper half of a body; first width obtaining means for obtaining a width of a shoulder part of the first piece of clothing in the first clothing image; first size adjusting means for adjusting a size of the first clothing image based on the width obtained by the first width obtaining means; second clothing image obtaining means for obtaining a second clothing image which is an image of a second piece of clothing worn on a lower half of the body; second width obtaining means for obtaining a width of a waist part of the second piece of clothing in the second clothing image; second size adjusting means for adjusting a size of the second clothing image based on the width obtained by the second width obtaining means; and display control means for causing display means to display a screen on which the first piece of clothing and the second piece of clothing are vertically displayed, based on the first clothing image that has been adjusted by the first size adjusting means and the second clothing image that has been adjusted by the second size adjusting means.

Further, a method of controlling a clothing image processing system according to one embodiment of the present invention is a method of controlling a clothing image processing system, the method including: a first clothing image obtaining step of obtaining a first clothing image which is an image of a first piece of clothing worn on an upper half of a body; a first width obtaining step of obtaining a width of a shoulder part of the first piece of clothing in the first clothing image; a first size adjusting step of adjusting a size of the first clothing image based on the width obtained in the first width obtaining step; a second clothing image obtaining step of obtaining a second clothing image which is an image of a second piece of clothing worn on a lower half of the body; a second width obtaining step of obtaining a width of a waist part of the second piece of clothing in the second clothing image; a second size adjusting step of adjusting a size of the second clothing image based on the width obtained in the second width obtaining step; and a display control step of causing display means to display a screen on which the first piece of clothing and the second piece of clothing are vertically displayed, based on the first clothing image that has been adjusted in the first size adjusting step and the second clothing image that has been adjusted in the second size adjusting step.

Further, a clothing image processing device according to one embodiment of the present invention is a clothing image processing device, including: first clothing image obtaining means for obtaining a first clothing image which is an image of a first piece of clothing worn on an upper half of a body; first width obtaining means for obtaining a width of a shoulder part of the first piece of clothing in the first clothing image; first size adjusting means for adjusting a size of the first clothing image based on the width obtained by the first width obtaining means; second clothing image obtaining means for obtaining a second clothing image which is an image of a second piece of clothing worn on a lower half of the body; second width obtaining means for obtaining a width of a waist part of the second piece of clothing in the second clothing image; and second size adjusting means for adjusting a size of the second clothing image based on the width obtained by the second width obtaining means.

Further, a method of controlling a clothing image processing device according to one embodiment of the present invention is a method of controlling a clothing image processing device, the method including: a first clothing image obtaining step of obtaining a first clothing image which is an image of a first piece of clothing worn on an upper half of a body; a first width obtaining step of obtaining a width of a shoulder part of the first piece of clothing in the first clothing image; a first size adjusting step of adjusting a size of the first clothing image based on the width obtained in the first width obtaining step; a second clothing image obtaining step of obtaining a second clothing image which is an image of a second piece of clothing worn on a lower half of the body; a second width obtaining step of obtaining a width of a waist part of the second piece of clothing in the second clothing image; and a second size adjusting step of adjusting a size of the second clothing image based on the width obtained in the second width obtaining step.

Further, a program according to one embodiment of the present invention is a program for causing a computer to function as: first clothing image obtaining means for obtaining a first clothing image which is an image of a first piece of clothing worn on an upper half of a body; first width obtaining means for obtaining a width of a shoulder part of the first piece of clothing in the first clothing image; first size adjusting means for adjusting a size of the first clothing image based on the width obtained by the first width obtaining means; second clothing image obtaining means for obtaining a second clothing image which is an image of a second piece of clothing worn on a lower half of the body; second width obtaining means for obtaining a width of a waist part of the second piece of clothing in the second clothing image; and second size adjusting means for adjusting a size of the second clothing image based on the width obtained by the second width obtaining means.

Further, a computer-readable information recording medium according to one embodiment of the present invention is a computer-readable information recording medium having recorded thereon a program for causing a computer to function as: first clothing image obtaining means for obtaining a first clothing image which is an image of a first piece of clothing worn on an upper half of a body; first width obtaining means for obtaining a width of a shoulder part of the first piece of clothing in the first clothing image; first size adjusting means for adjusting a size of the first clothing image based on the width obtained by the first width obtaining means; second clothing image obtaining means for obtaining a second clothing image which is an image of a second piece of clothing worn on a lower half of the body; second width obtaining means for obtaining a width of a waist part of the second piece of clothing in the second clothing image; and second size adjusting means for adjusting a size of the second clothing image based on the width obtained by the second width obtaining means.

Further, according to an aspect of the present invention, the clothing image processing system may further include: background area detecting means for detecting a background area in a clothing image; and background area removing means for removing the background area from the clothing image, and the background area detecting means may include: means for initially setting, as the background area, pixel lines adjacent to four sides of the clothing image; means for determining whether or not an adjacent pixel, which is adjacent to a pixel in the background area, has a color that is the same as or similar to a color of the pixel in the background area; and means for expanding the background area by adding the adjacent pixel to the background area in a case where the adjacent pixel has the color that is the same as or similar to the color of the pixel in the background area, and the background area is removed from each of the first clothing image and the second clothing image by the background area detecting means and the background area removing means.

Further, according to an aspect of the present invention, the clothing image processing system may further include: means for obtaining, for each of a plurality of pixel lines in the first clothing image, a number of pixels that are included in an area where the first piece of clothing is shown; and means for detecting a pixel line that corresponds to the shoulder part from among the plurality of pixel lines, based on a frequency distribution on the number of pixels of each of the plurality of pixel lines, and the first width obtaining means may obtain the width of the first piece of clothing along the pixel line that corresponds to the shoulder part.

Further, according to an aspect of the present invention, the clothing image processing system may further include first enlargement/reduction ratio determining means for determining an enlargement ratio or a reduction ratio for the first clothing image, based on a degree of difference between the width obtained by the first width obtaining means and a given first reference length, and the first size adjusting means may enlarge or reduce the first clothing image based on the enlargement ratio or reduction ratio determined by the first enlargement/reduction ratio determining means.

Further, according to an aspect of the present invention, the clothing image processing system may further include: means for obtaining, for each of a plurality of pixel lines in the second clothing image, a number of pixels that are included in an area where the second piece of clothing is shown; and means for detecting a pixel line that corresponds to the waist part from among the plurality of pixel lines, based on a frequency distribution on the number of pixels of each of the plurality of pixel lines, and the second width obtaining means may obtain the width of the second piece of clothing along the pixel line that corresponds to the waist part.

Further, according to an aspect of the present invention, the clothing image processing system may further include second enlargement/reduction ratio determining means for determining an enlargement ratio or a reduction ratio for the second clothing image, based on a degree of difference between the width obtained by the second width obtaining means and a given second reference length, and the second size adjusting means may enlarge or reduce the second clothing image based on the enlargement ratio or reduction ratio determined by the second enlargement/reduction ratio determining means.

Further, according to an aspect of the present invention, the display control means may cause the display means to display the screen on which the first piece of clothing and the second piece of clothing are displayed in a positional relation corresponding to a positional relation between shoulders and waists of a person, based on the first clothing image that has been adjusted by the first size adjusting means and the second clothing image that has been adjusted by the second size adjusting means.

Further, according to an aspect of the present invention, the clothing image processing system may further include: shoe image obtaining means for obtaining a shoe image; third width obtaining means for obtaining a width of a pair of shoes in the shoe image, the third width obtaining means obtaining the width of the pair of shoes along a pixel line that is placed below an uppermost part of the shoes at a distance obtained by multiplying a height of the shoes by a given coefficient α (0<α<1); and third size adjusting means for adjusting a size of the shoe image based on the width obtained by the third width obtaining means, and the display control means may cause the display means to display the screen on which the first piece of clothing, the second piece of clothing, and the pair of shoes are vertically displayed, based on the first clothing image that has been adjusted by the first size adjusting means, the second clothing image that has been adjusted by the second size adjusting means, and the shoe image that has been adjusted by the third size adjusting means.

Further, according to an aspect of the present invention, the clothing image processing system may further include third enlargement/reduction ratio determining means for determining an enlargement ratio or a reduction ratio for the shoe image, based on a degree of difference between the width obtained by the third width obtaining means and a given third reference length, and the third size adjusting means may enlarge or reduce the shoe image based on the enlargement ratio or reduction ratio determined by the third enlargement/reduction ratio determining means.

Further, according to an aspect of the present invention, the display control means may cause the display means to display the screen on which the first piece of clothing, the second piece of clothing, and the pair of shoes are displayed in a positional relation corresponding to a positional relation between shoulders, waists, and feet of a person, based on the first clothing image that has been adjusted by the first size adjusting means, the second clothing image that has been adjusted by the second size adjusting means, and the shoe image that has been adjusted by the third size adjusting means.

Further, according to an aspect of the present invention, the clothing image processing system may further include: means for receiving specification of a category of pieces of clothing worn on the upper half of the body; and means for receiving specification of a category of pieces of clothing worn on the lower half of the body, and the display control means may include: means for causing the display means, in a case where the specification of the category of pieces of clothing worn on the upper half of the body is received, to display the screen on which the first piece of clothing that belongs to the specified category is displayed, based on the first clothing image that has been adjusted by the first size adjusting means; and means for causing the display means, in a case where the specification of the category of pieces of clothing worn on the lower half of the body is received, to display the screen on which the second piece of clothing that belongs to the specified category is displayed, based on the second clothing image that has been adjusted by the second size adjusting means.

Further, according to an aspect of the present invention, the first clothing image obtaining means may include means for obtaining, as the first clothing image, an image of a piece of clothing worn on the upper half of the body that is photographed or specified by a user, and the second clothing image obtaining means may include means for obtaining, as the second clothing image, an image of a piece of clothing worn on the lower half of the body that is photographed or specified by the user.

Advantageous Effects of Invention

According to one embodiment of the present invention, it is possible to make, on the screen on which the combination of the top wear image and the bottom wear image is displayed, for example, the balance between the sizes (scales) of the top wear and the bottom wear closer to the balance between the actual sizes of the top wear and the bottom wear.

BRIEF DESCRIPTION OF DRAWINGS

FIG. 2 is a diagram showing an example of a store table.

FIG. 3 is a diagram showing an item table.

DESCRIPTION OF EMBODIMENTS

An exemplary embodiment of the present invention is described below in detail with reference to the drawings. Described here is a case in which the present invention is applied to an electronic commerce system. Specifically, the description is about an example of a case where a clothing image processing system according to the embodiment of the present invention is implemented in an electronic commerce system that implements a virtual shopping mall housing a plurality of stores.

Figure 1:
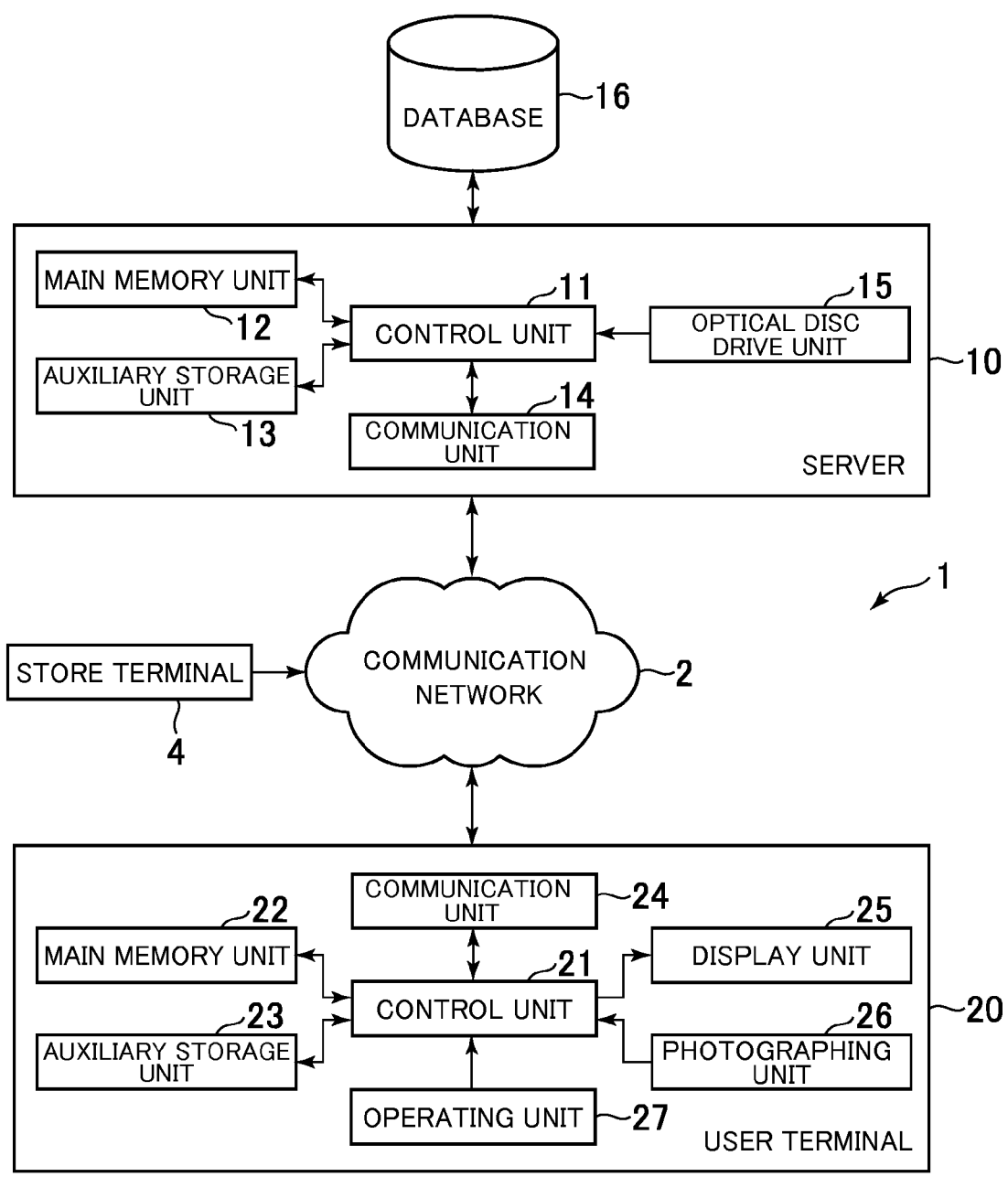
FIG. 1 is a diagram illustrating an example of the overall configuration of an electronic commerce system (clothing image processing system) according to an embodiment of the present invention.

FIG. 1 illustrates the overall configuration of the electronic commerce system according to the embodiment of the present invention. As illustrated in FIG. 1, the electronic commerce system according to the embodiment 1 (a clothing image processing system) includes a server 10, a database 16, a user terminal 20, and a store terminal 4. Though omitted from FIG. 1, the electronic commerce system 1 actually includes a plurality of user terminals 20 and a plurality of store terminals 4.

The server 10, the user terminal 20, and the store terminal 4 are connected to a communication network 2, which includes the Internet or the like. The server 10 and the user terminal 20 can communicate data to and from each other. The server 10 and the store terminal 4 can communicate data to and from each other.

The server 10 is, for example, a virtual shopping mall server which functions as a portal of the virtual shopping mall. The server 10 executes processing based on a processing request which is received from the user terminal 20 or the store terminal 4. The server 10 includes a control unit 11, a main memory unit 12, an auxiliary storage unit 13, a communication unit 14, and an optical disc drive unit 15.

The control unit 11 includes, for example, one or a plurality of CPUs, and executes information processing in accordance with an operating system or a program stored in the auxiliary storage unit 13. The main memory unit 12 is, for example, a RAM. The auxiliary storage unit 13 is, for example, a hard disk or a solid state drive. The communication unit 14 is used for performing data communication via the communication network 2. The optical disc drive unit 15 is used for reading a program or data recorded on an optical disc (information recording medium).

The program or data is supplied to the auxiliary storage unit 13 via an optical disc (information recording medium). Specifically, the program or data stored on the optical disc is read by the optical disc drive unit 15 and stored in the auxiliary storage unit 13. Note that, the server 10 may include a component necessary for reading a program or data stored in an information recording medium (for example, a memory card) other than the optical disc. Then, the program or data may be supplied to the auxiliary storage unit 13 via the information recording medium (for example, a memory card) other than the optical disc. Alternatively, a program or data may be supplied to the auxiliary storage unit 13 via the communication network 2.

The server 10 is accessible to the database 16. The database 16 may be built in the server 10, or may be built in another server than the server 10. The database 16 stores, for example, information of users who use the virtual shopping mall, information of stores that open in the virtual shopping mall, information of items dealt with in the virtual shopping mall, and information of transactions made in the virtual shopping mall. FIG. 2 and FIG. 3 each show an example of data stored in the database 16.

FIG. 2 shows an example of a store table. Information of stores that open in the virtual shopping mall is registered in the store table. The store table of FIG. 2 includes a "store ID" field, a "name" field, an "address" field, and a "URL" field.

The "store ID" field shows identification information (store ID) for identifying a store that opens in the virtual shopping mall. The "name" field shows the name of the store. The "address" field shows the address of the store. The "URL" field shows information of a link (a URL) to a Web page of the store.

FIG. 3 shows an example of an item table. Information of items dealt with in the virtual shopping mall is registered in the item table. The item table of FIG. 3 includes an "item ID" field, a "store" field, a "name" field, a "category" field, a "price" field, a "stock" field, and a "URL" field.

The "item ID" field shows identification information for uniquely identifying an item (item ID). The "store" field shows the store ID of a store that deals with the item. The "name" field shows the name of the item. The "category" field shows a main category and sub-category of the item. The "price" field shows the price of the item. The "stock" field shows how many pieces of the item are in stock. The "URL" field shows information of a link (a URL) to a Web page of the item.

The store terminal 4 is an information processing device that is provided on the store that opens in the virtual shopping mall. The store terminal 4 is, for example, a personal computer. The store terminal 4 is used to register information of an item to be sold in the virtual shopping mall and other types of information in the database 16 via the server 10. For instance, a special screen which is provided by the server 10 is displayed on the store terminal 4. A manager of the store inputs information of the store, information of an item, and the like on the special screen.

The user terminal 20 is an information processing device that is used by a user. The user terminal 20 is, for example, a cell phone (including a smartphone), a portable information terminal, or a personal computer. The user terminal 20 in the following description is a cell phone (a smartphone).

The user terminal 20 includes a control unit 21, a main memory unit 22, an auxiliary storage unit 23, a communication unit 24, a display unit 25, a photographing unit 26, and an operating unit 27. The control unit 21, the main memory unit 22, the auxiliary storage unit 23, and the communication unit 24 are the same as the control unit 11, the main memory unit 12, the auxiliary storage unit 13, and the communication unit 14 of the server 10.

A program or data is supplied to the auxiliary storage unit 23 via the communication network 2. Note that, the user terminal 20 may include an optical disc drive unit. Then, a program or data may be supplied to the auxiliary storage unit 23 via an optical disc (information recording medium). Alternatively, the user terminal 20 may include a component necessary for reading a program or data stored in an information recording medium (for example, a memory card) other than the optical disc. Then, the program or data may be supplied to the auxiliary storage unit 23 via the information recording medium (for example, a memory card) other than the optical disc.

The display unit 25 is, for example, a liquid crystal display or an organic EL display, and displays various kinds of screens. The photographing unit 26 is, for example, a digital camera. The photographing unit 26 is capable of taking a still image. The photographing unit 26 is also capable of photographing a video. For instance, the photographing unit 26 takes a picture at given time intervals (e.g., $\frac{1}{60}$-second intervals). In other words, the photographing unit 26 photographing a video that has a given number of frames (e.g., sixty frames) per second. A still image or video taken by the photographing unit 26 is saved in the auxiliary storage unit 13.

The operating unit 27 is used by a user for operation. For example, a pointing device for allowing the user to specify a position in the screen displayed on the display unit 25 is equipped as the operating unit 27. For example, a touch panel overlaid on the display unit 25 is equipped in the user terminal 20. Note that, the user terminal 20 may include, for example, a mouse, a stick, or a touchpad instead of the touch panel.

The electronic commerce system 1 allows a user to check various coordinates (combinations of clothing and shoes) when purchasing clothing and shoes. This function is described below.

Figure 4:
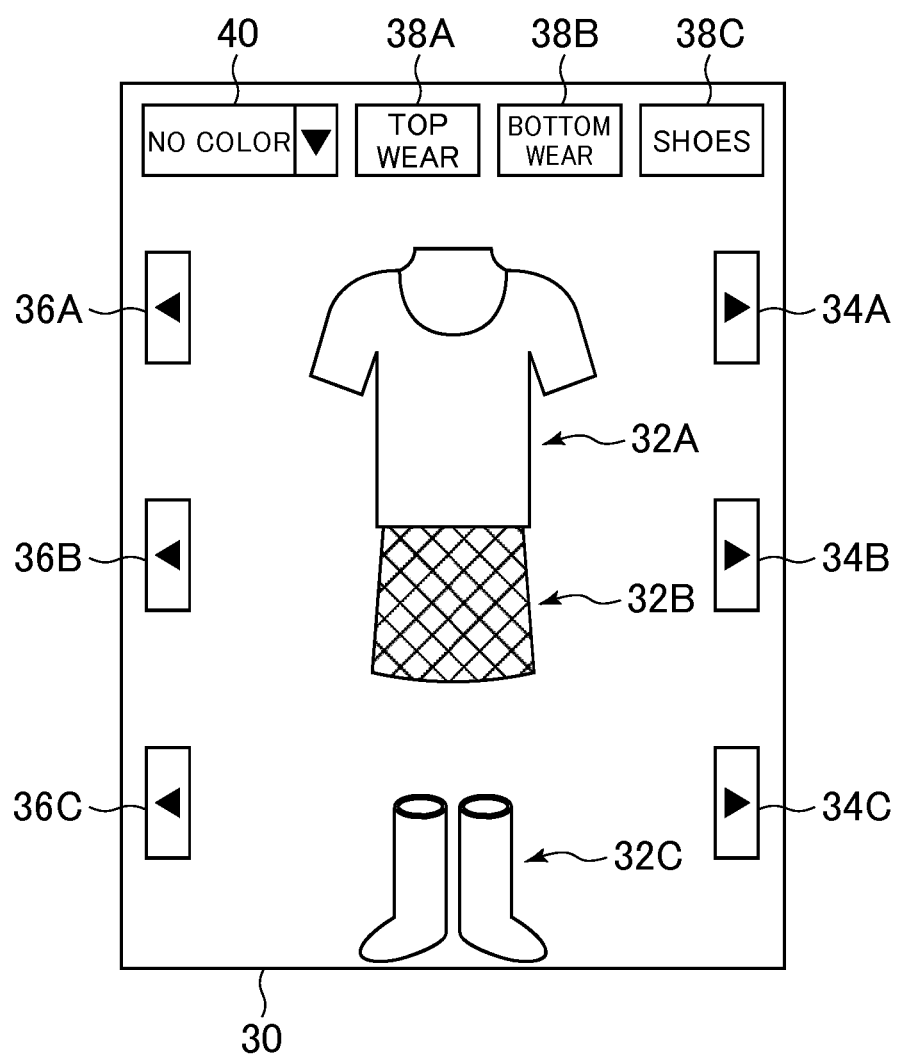
FIG. 4 is a diagram illustrating an example of a coordinate screen.

FIG. 4 illustrates an example of a coordinate screen which is displayed on the display unit 25 of the user terminal 20. The coordinate screen 30 of FIG. 4 is displayed based on data transmitted to the user terminal 20 from the server 10.

As illustrated in FIG. 4, a combination of a top wear image 32A, a bottom wear image 32B, and a shoe image 32C is displayed on the coordinate screen 30. The top wear image 32A is an image of a top wear that is selected from among top wears sold in the virtual shopping mall. Similarly, the bottom wear image 32B is an image of a bottom wear that is selected from among bottom wears sold in the virtual shopping mall, and the shoe image 32C is an image of a pair of shoes that is selected from among pairs of shoes sold in the virtual shopping mall.

Forward buttons 34A, 34B, and 34C and back buttons 36A, 36B, and 36C are also displayed on the coordinate screen 30. The user presses these buttons to change the combination of the top wear image 32A, the bottom wear image 32B, and the shoe image 32C that are displayed on the coordinate screen 30.

A plurality of top wear images 32A are displayed on the coordinate screen 30 in a given order. The forward button 34A and the back button 36A are buttons for switching the top wear image 32A that is displayed on the coordinate screen 30. With the press of the forward button 34A, the next top wear image 32A is displayed on the coordinate screen 30. On the other hand, with the press of the back button 36A, the preceding top wear image 32A is displayed on the coordinate screen 30.

Similarly, a plurality of bottom wear images 32B are displayed on the coordinate screen 30 in a given order. The forward button 34B and the back button 36B are buttons for switching the bottom wear image 32B that is displayed on the coordinate screen 30. With the press of the forward button 34B, the next bottom wear image 32B is displayed on the coordinate screen 30. On the other hand, with the press of the back button 36B, the preceding bottom wear image 32B is displayed on the coordinate screen 30.

A plurality of shoe images 32C further displayed on the coordinate screen 30 in a given order. The forward button 34C and the back button 36C are buttons for switching the shoe image 32C that is displayed on the coordinate screen 30. With the press of the forward button 34C, the next shoe image 32C is displayed on the coordinate screen 30. On the other hand, with the press of the back button 36C, the preceding shoe image 32C is displayed on the coordinate screen 30.

A top wear button 38A, a bottom wear button 38B, and a shoes button 38C are also displayed on the coordinate screen 30.

The top wear button 38A is a button for starting the automatic switching of the top wear image 32A that is displayed on the coordinate screen 30. With the press of the top wear button 38A, the top wear image 32A that is displayed on the coordinate screen 30 is switched automatically at given time intervals (e.g., 2-second intervals) in a given order. When the top wear button 38A is pressed again, the automatic switching of the top wear image 32A that is displayed on the coordinate screen 30 is stopped.

Similarly, the bottom wear button 38B is a button for starting the automatic switching of the bottom wear image 32B that is displayed on the coordinate screen 30. With the press of the bottom wear button 38B, the bottom wear image 32B that is displayed on the coordinate screen 30 is switched automatically at given time intervals (e.g., 2-second intervals) in a given order. When the bottom wear button 38B is pressed again, the automatic switching of the bottom wear image 32B that is displayed on the coordinate screen 30 is stopped.

The shoes button 38C is a button for starting the automatic switching of the shoe image 32C that is displayed on the coordinate screen 30. With the press of the shoes button 38C, the shoe image 32C that is displayed on the coordinate screen 30 is switched automatically at given time intervals (e.g., 2-second intervals) in a given order. When the shoes button 38C is pressed again, the automatic switching of the shoe image 32C that is displayed on the coordinate screen 30 is stopped.

A background field 40 is also displayed on the coordinate screen 30. The background field 40 is for selecting a background of the coordinate screen 30.

Figure 5:
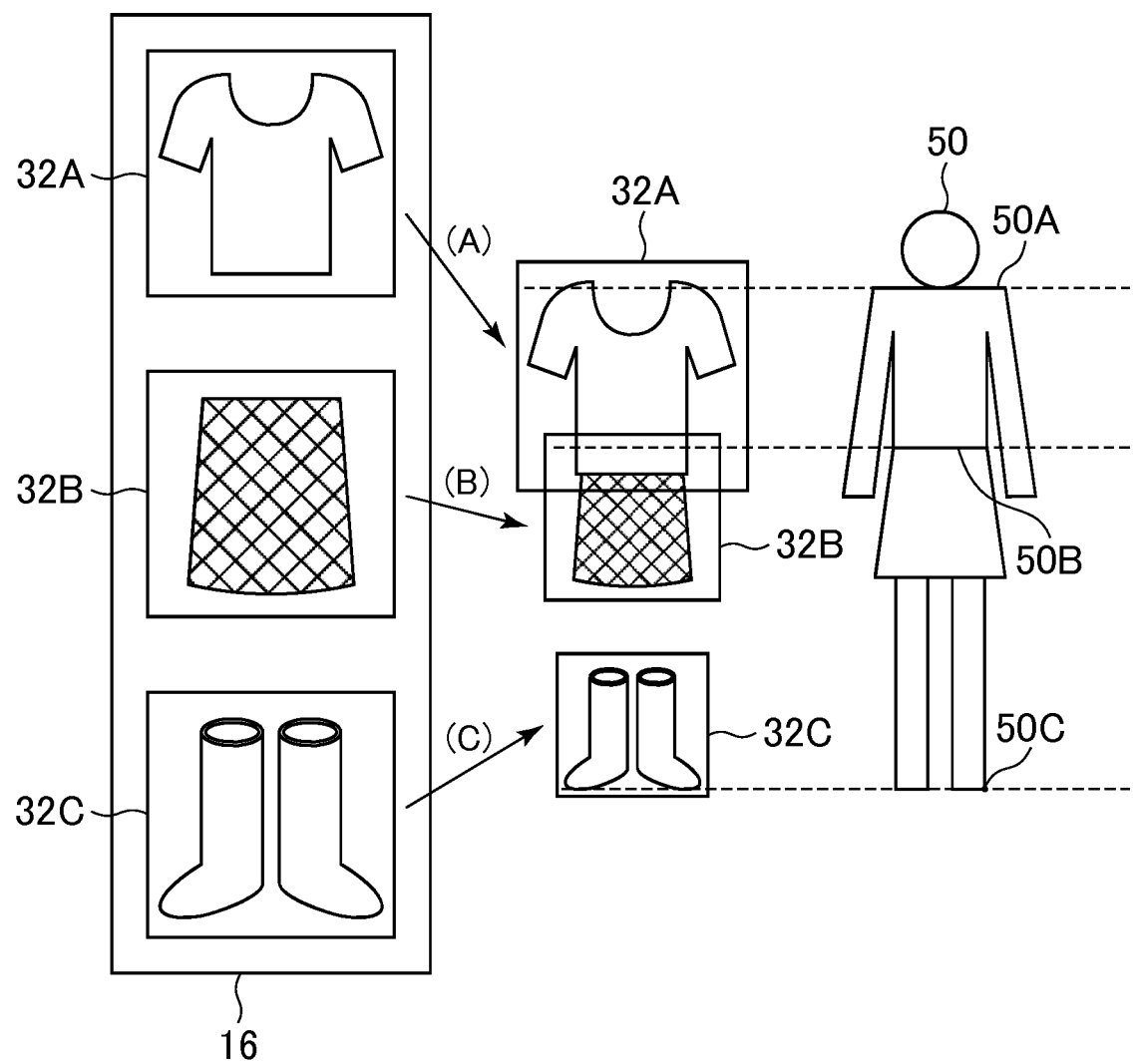
FIG. 5 is a diagram explaining the coordinate screen.

FIG. 5 is a diagram that explains the coordinate screen 30 in detail. The top wear image 32A, the bottom wear image 32B, and the shoe image 32C are displayed on the coordinate screen 30 in a balance close to the balance of the actual sizes of the top wear, the bottom wear, and the pair of shoes. Specifically, the top wear image 32A, the bottom wear image 32B, and the shoe image 32C are each adjusted in size (enlarged or reduced) on the coordinate screen 30 (arrows A, B, and C in FIG. 5) and, as a result, the top wear image 32A, the bottom wear image 32B, and the shoe image 32C are displayed in a balance close to the balance of the actual sizes of the top wear, the bottom wear, and the pair of shoes.

The top wear image 32A, the bottom wear image 32B, and the shoe image 32C are also displayed on the coordinate screen 30 so that the positional relation between the images corresponds to the positional relation between the shoulders, waists (the hips), and feet of a person. Specifically, the top wear image 32A is displayed according to a position of a shoulder part 50A of a virtual human body model 50. The bottom wear image 32B is displayed according to a position of a waist part 50B of the virtual human body model 50. The shoe image 32C is displayed according to a position of a sole part 50C of the virtual human body model 50.

The top wear image 32A is set to the highest priority level and the shoe image 32C is set to the lowest priority level on the coordinate screen 30. Accordingly, when the top wear image 32A partially overlaps with the bottom wear image 32B or the shoe image 32C, the top wear image 32A is displayed preferentially. When the bottom wear image 32B partially overlaps with the shoe image 32C, the bottom wear image 32B is displayed preferentially.

The following description is about a configuration for displaying the coordinate screen 30 described above. Processing for generating the top wear image 32A, the bottom wear image 32B, and the shoe image 32C to be stored in the database 16 is described first.

The top wear image 32A, the bottom wear image 32B, and the shoe image 32C are each generated based on, for example, a photographed image of a top wear, a bottom wear, or a pair of shoes.

Figure 6:
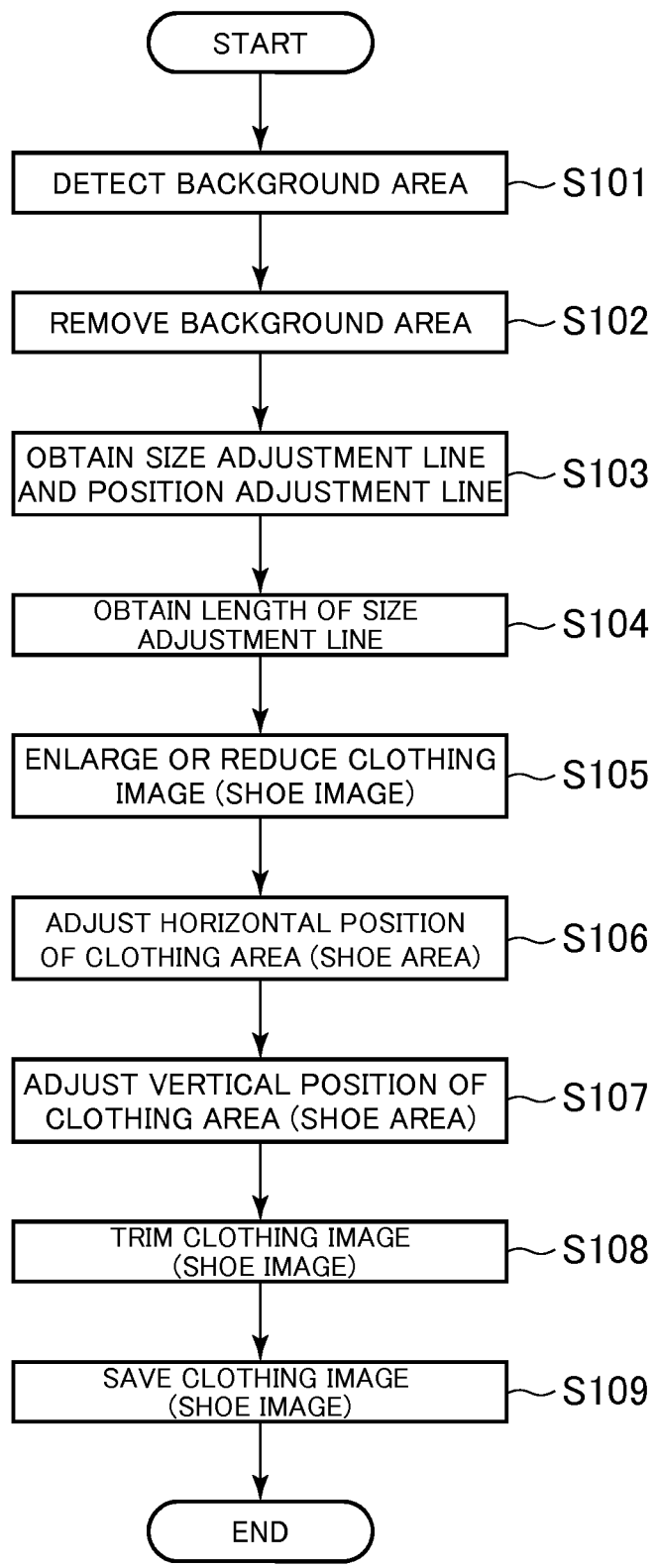
FIG. 6 is a flow chart illustrating an example of processing for generating a top wear image, a bottom wear image, or a shoe image.

FIG. 6 is a flow chart illustrating an example of the processing for generating the top wear image 32A, the bottom wear image 32B, and the shoe image 32C. The processing of FIG. 6 is executed in, for example, the server 10. The server 10 (a clothing image processing device) executes the processing of FIG. 6 when, for example, item information is newly registered by a person in charge of the store and a photographed image of a top wear, a bottom wear, or a pair of shoes is transmitted to the server 10.

A case of generating the top wear image 32A or the bottom wear image 32B based on a photographed image of a top wear or a bottom wear is described first. In the following description, a photographed image of a top wear or a bottom wear is referred to as "clothing image".

As illustrated in FIG. 6, the control unit 11 of the server 10 first detects a background area in the clothing image (S101). The term "background area" means an area other than an area (a clothing area) where the piece of clothing is photographed.

Figure 7A:
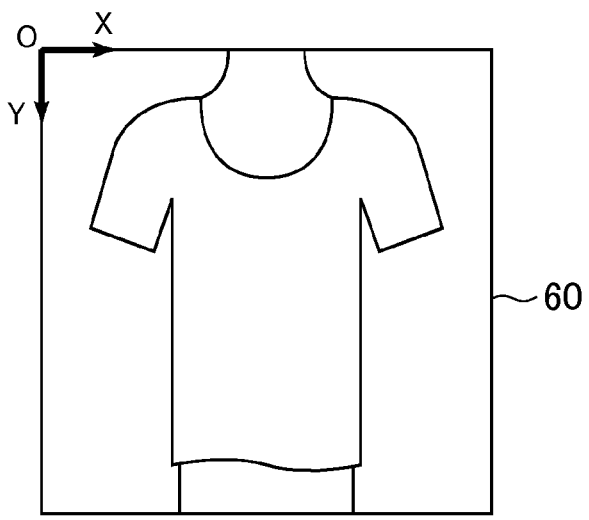
FIG. 7A is a diagram explaining an example of how a background area is detected.
Figure 7B:
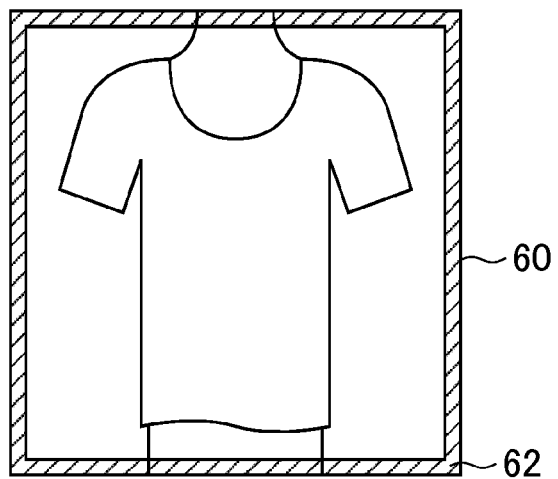
FIG. 7B is a diagram explaining the example of how the background area is detected.
Figure 7C:
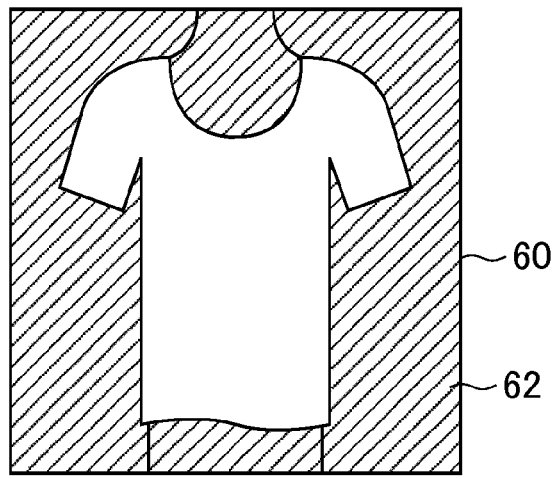
FIG. 7C is a diagram explaining the example of how the background area is detected.

FIG. 7A, FIG. 7B, and FIG. 7C are diagrams that explains an example of how a background area is detected. FIG. 7A illustrates an example of a clothing image to be processed by background area detecting processing. The clothing image 60 of FIG. 7A is a photographed image of a top wear worn on a mannequin. The clothing image 60 is an image in which the piece of clothing is photographed against a background of a solid color or a background that has colors similar to one another. In the clothing image 60 of FIG. 7A, the color of the clothing area is not the same or similar to the colors of other areas than the clothing area.

To detect a background area in the clothing image 60, the control unit 11 first sets pixel lines (pixel rows and pixel columns) adjacent to the four sides of the clothing image 60 as a background area 62 as illustrated in FIG. 7B.

Thereafter, the control unit 11 determines whether or not an adjacent pixel which is adjacent to a pixel in the background area 62 has a color that is the same as or similar to the color of the pixel in the background area 62. An "adjacent pixel" is a pixel that is adjacent to a pixel in the background area 62 and that is not included in the background area 62.

For instance, the control unit 11 determines whether or not the degree of similarity between the color of the pixel in the background area 62 and the color of the adjacent pixel is higher than a reference similarity. When the degree of similarity is higher than the reference similarity, the control unit 11 determines that the adjacent pixel has a color that is the same as or similar to the color of the pixel in the background area 62.

More specifically, the control unit 11 calculates the Euclidean distance between the color value (for example, RGB value) of the pixel in the background area 62 and the color value (for example, RGB value) of the adjacent pixel. The control unit 11 determines whether or not the calculated Euclidean distance is smaller than a reference value. When the Euclidean distance is smaller than the reference value, the control unit 11 determines that the adjacent pixel has a color that is the same as or similar to the color of the pixel in the background area 62.

Color may be expressed by other color values than the RGB value. For instance, a color value in the CIELAB color space or the HSV color space is used in some cases. The method of determining whether or not two colors are the same as or similar to each other is not limited to the one that uses the Euclidean distance. For instance, the mean square error, the Mahalanobis distance, or the Earth Mover's distance may be used to determine whether or not two colors are the same as or similar to each other.

When it is determined that the adjacent pixel has a color that is the same as or similar to the color of the pixel in the background area 62, the control unit 11 adds this adjacent pixel to the background area 62. The control unit 11 expands the background area 62 in this manner.

The processing described above is executed repeatedly until no more adjacent pixel is found that is the same as or similar to a pixel in the background area 62 in color. The background area 62 as the one illustrated in FIG. 7C is detected as a result.

After executing Step S101, the control unit 11 removes the background area 62 in the clothing image 60 (S102). The control unit 11 makes the background area 62 in the clothing image 60 transparent.

After executing Step S102, the control unit 11 obtains a size adjustment line and a position adjustment line (S103). The "size adjustment line" is used as a reference for adjusting the size of a clothing image (the term includes the top wear image 32A and the bottom wear image 32B). The "position adjustment line", on the other hand, is used as a reference for adjusting the display position of a clothing image (the term includes the top wear image 32A and the bottom wear image 32B) on the coordinate screen 30. Details of roles of the size adjustment line and the position adjustment line are described later.

Figure 8:
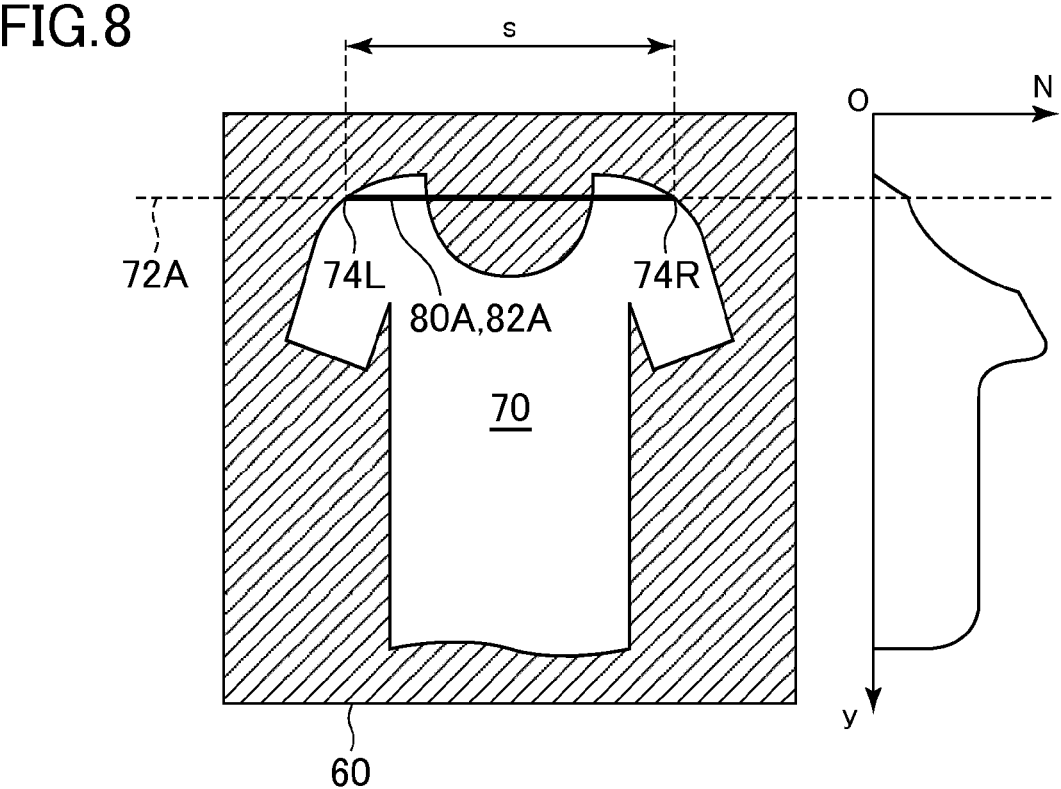
FIG. 8 is a diagram explaining an example of how a size adjustment line is obtained in the case of the top wear image.

FIG. 8 is a diagram that explains an example of how the size adjustment line and the position adjustment line are obtained in the case where the clothing image 60 is a top wear image. When the clothing image 60 is a top wear image, a size adjustment line 80A is obtained by detecting a shoulder line 72A.

The control unit 11 first converts the clothing image 60 into a binary image. FIG. 8 illustrates the clothing image 60 that has been converted into a binary image.

Thereafter, for each pixel row in the clothing image 60 (namely, each pixel line that extends in a direction corresponding to the lateral direction of the piece of clothing), the control unit 11 counts the number of pixels that are included in a clothing area 70 (the counted number (N)). A graph in FIG. 8 shows a histogram of the counted number (N) of the respective pixel rows.

The shoulder line 72A is detected by examining the slope of the histogram because the curvature tends to be large in the shoulder part in the case of a top wear image. Specifically, the control unit 11 examines changes in a curvature $\theta(y)$ of the histogram from the top of the clothing image 60 in order.

Changes in the curvature $\theta(y)$ are calculated by calculating an inner product through the following Expression (1) based on the histogram hist (y) described above. For example, when the vertical sides and lateral sides of the clothing image 60 are both 400 pixels in length, a height h is set to 5 pixels to obtain the curvature $\theta(y)$.

[Mathematical Expression 1]

$$\begin{cases} \vec{A} = (hist(y-h), -h) \\ \vec{B} = (hist(y+h), h) \\ \theta(y) = \dfrac{\cos^{-1}(\vec{A} \cdot \vec{B})}{|\vec{A}||\vec{B}|} \end{cases} \quad (1)$$

The control unit 11 examines the curvature $\theta(y)$ from the top of the clothing image 60 in order, and detects a point where a change in the curvature $\theta(y)$ exceeds a given value (e.g., 180°) for the first time as the shoulder position. In other words, the control unit 11 detects as the shoulder line 72A a pixel row where a change in the curvature $\theta(y)$ exceeds a given value (e.g., 180°) for the first time.

The control unit 11 then obtains, as the size adjustment line 80A, a part of the pixel row detected as the shoulder line 72A that is between a left edge 74L of the clothing area 70 and a right edge 74R of the clothing area 70. The control unit 11 also sets the size adjustment line 80A as a position adjustment line 82A in the case of a top wear image.

Figure 9:
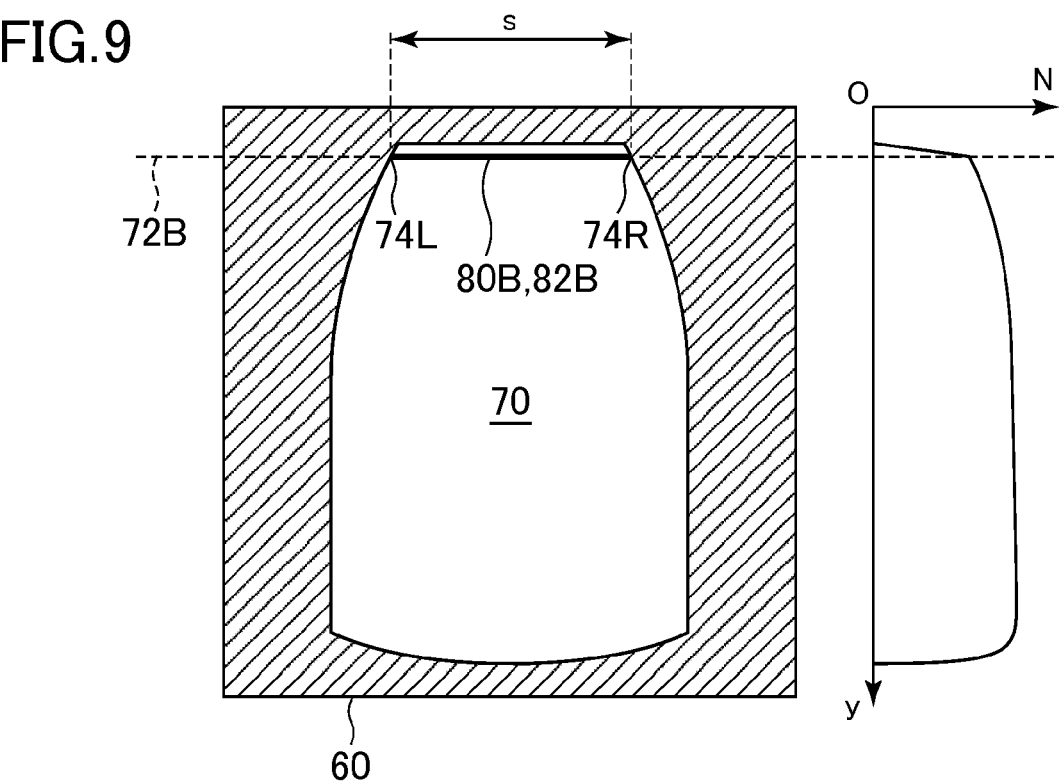
FIG. 9 is a diagram explaining the example of how the size adjustment line is obtained in the case of the bottom wear image.

FIG. 9 is a diagram that explains an example of how the size adjustment line and the position adjustment line are obtained in the case where the clothing image 60 is a bottom wear image. When the clothing image 60 is a bottom wear image, a size adjustment line 80B is obtained by detecting a waist line 72B.

The control unit 11 first converts the clothing image 60 into a binary image. Similarly to FIG. 8, FIG. 9 illustrates the clothing image 60 that has been converted into a binary image.

Thereafter, for each pixel row in the clothing image 60 (namely, each pixel line that extends in a direction corresponding to the lateral direction of the piece of clothing), the control unit 11 counts the number of pixels that are included in a clothing area 70 (the counted number (N)). A graph in FIG. 9 shows a histogram of the counted number (N) of the respective pixel rows.

Similarly to the top wear image, the waist line 72B is detected by examining the slope of the histogram because the curvature tends to be large in the waist part in the case of a bottom wear image. Specifically, the control unit 11 examines changes in a curvature θ (y) of the histogram from the top of the clothing image 60 in order. Changes in the curvature θ(y) are calculated by calculating an inner product through the above-mentioned Expression (1) based on the histogram hist (y) described above.

The control unit 11 examines the curvature θ(y) from the top of the clothing image 60 in order, and detects a point where a change in the curvature θ(y) exceeds a given value (e.g., 180°) for the first time as the waist position. In other words, the control unit 11 detects as the waist line 72B a pixel row where a change in the curvature θ(y) exceeds a given value (e.g., 180°) for the first time.

The control unit 11 then obtains, as the size adjustment line 80B, a part of the pixel row detected as the waist line 72B that is between a left edge 74L of the clothing area 70 and a right edge 74R of the clothing area 70. Similarly to the top wear image, the control unit 11 also sets the size adjustment line 80B as a position adjustment line 82B in the case of a bottom wear image. In the following description, the size adjustment lines 80A and 80B may collectively be referred to as "size adjustment lines 80", and the position adjustment lines 82A and 82B may collectively be referred to as "position adjustment lines 82".

After executing Step S103, the control unit 11 executes processing for normalizing the clothing image 60. Because the size (scale) and position of the piece of clothing (clothing area) in the clothing image 60 varies from one clothing image 60 to another, the size and center position of the clothing image 60 is adjusted in the following steps based on the size adjustment line 80 detected in Step S103.

The control unit 11 first obtains a length (s) of the size adjustment line 80 (S104).

In the case of FIG. 8 (a top wear image), the length (s) of the size adjustment line 80A is the width of the clothing area 70 along the shoulder line 72A, in other words, the length of a part of the shoulder line 72A from one edge (the left edge 74L) of the clothing area 70 to the other edge (the right edge 74R) of the clothing area 70.

Similarly, in the case of FIG. 9 (a bottom wear image), the length (s) of the size adjustment line 80B is the width of the clothing area 70 along the waist line 72B, in other words, the length of a part of the waist line 72B from one edge (the left edge 74L) of the clothing area 70 to the other edge (the right edge 74R) of the clothing area 70.

After executing Step S104, the control unit 11 enlarges or reduces the clothing image 60 so that the length (s) of the size adjustment line 80 equals a given length (S) (S105).

In other words, the control unit 11 determines an enlargement ratio or a reduction ratio that makes the length (s) of the size adjustment line 80 equal to the given length (S), based on the degree of difference between the length (s) of the size adjustment line 80 and the given length (S). Specifically, the control unit 11 obtains the enlargement ratio or the reduction ratio by dividing the given length (S) by the length (s) of the size adjustment line 80. The control unit 11 then enlarges or reduces the clothing image 60 according to the determined enlargement ratio or reduction ratio.

After executing Step S105, the control unit 11 adjusts the horizontal position (the position in an X-axis direction) of the clothing area 70 in the clothing image 60 (S106).

For instance, the control unit 11 moves the clothing area 70 within the clothing image 60 in a horizontal direction (the positive or negative X-axis direction) so that the midpoint of the size adjustment line 80 is positioned on a line that runs through the center point of the clothing image 60 and that extends in a vertical direction (a Y-axis direction).

The control unit 11 also adjusts the vertical position (the position in a Y-axis direction) of the clothing area 70 in the clothing image 60 (S107).

For instance, the control unit 11 moves the clothing area 70 within the clothing image 60 in a vertical direction (the positive or negative Y-axis direction) so that the size adjustment line 80 is positioned at a given distance (d pixels) from the upper side of the clothing image 60.

The control unit 11 further trims the clothing image 60 so that the clothing image 60 has a given width (w) (S108). The control unit 11 saves the thus normalized clothing image 60 in the database 16 as the top wear image 32A or the bottom wear image 32B (S109).

A case of generating the shoe image 32C based on a photographed image of a pair of shoes is described next.

The case of generating the shoe image 32C based on a photographed image of a pair of shoes is basically the same as the case of generating the top wear image 32A or the bottom wear image 32B.

However, the method of obtaining the size adjustment line 80 and the position adjustment line 82 in the case of generating the shoe image 32C based on a photographed image of a pair of shoes differs from the case of generating the top wear image 32A or the bottom wear image 32B based on a photographed image of a top wear or a bottom wear.

Shoe shape varies greatly depending on shoe type, such as boots and pumps. It is therefore difficult to obtain the size adjustment line 80 in an appropriate manner by using changes in curvature as in the case of a top wear image (FIG. 8) or a bottom wear image (FIG. 9). Accordingly, a method different from the one for top wear images and bottom wear images is used to obtain the size adjustment line 80 and the position adjustment line 82 in the case of a shoe image.

Figures 10, 11:
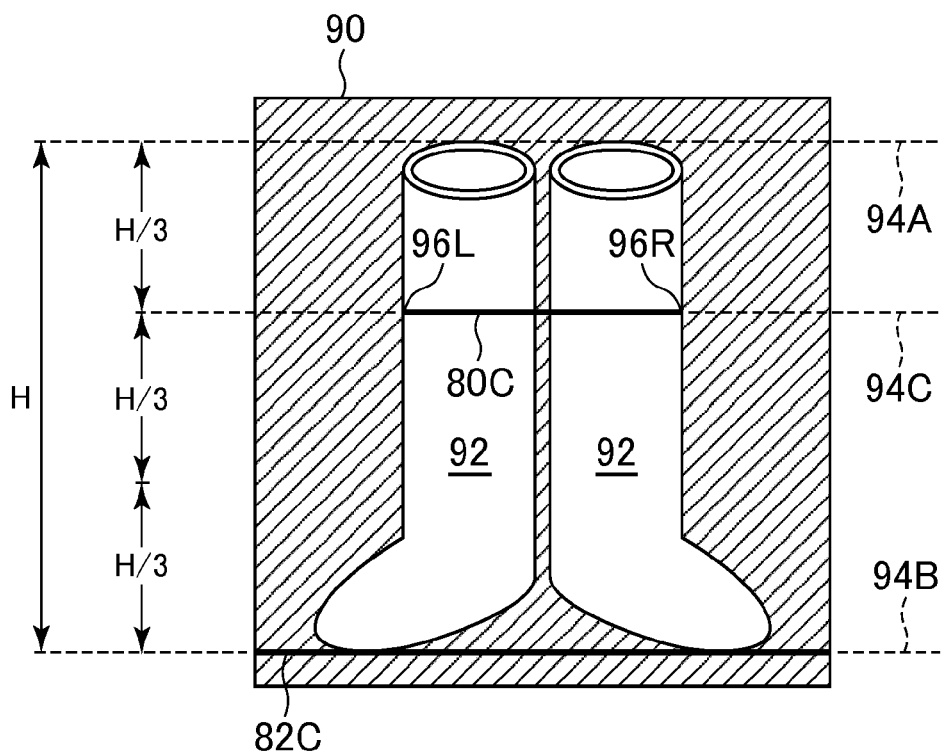
FIG. 10 is a diagram explaining the example of how the size adjustment line is obtained in the case of the shoe image.
FIG. 11 is a diagram showing an example of an image table.

FIG. 10 is a diagram that explains an example of how the size adjustment line 80 and the position adjustment line 82 of the shoe image are obtained.

The control unit 11 first obtains a height (H) of a shoe area 92. Specifically, the control unit 11 obtains a distance between a first pixel line 94A (pixel row) that runs through the uppermost part of the shoe area 92 and a second pixel line 94B (pixel row) that runs through the lowermost part of the shoe area 92.

The control unit 11 also obtains a third pixel line 94C, which makes the ratio of its distance from the first pixel line 94A and its distance from the second pixel line 94B equal to a given ratio (for example, 1:2). The third pixel line 94C is a pixel line that is placed below (the positive Y-axis direction) the first pixel line 94A at a distance obtained by multiplying the height (H) by a given coefficient α (0<α<1, for example, ⅓).

The control unit 11 then obtains, as a size adjustment line 80C, a part of the third pixel line 94C that is between a left edge 96L of the shoe area 92 and a right edge 96R of the shoe area 92. The control unit 11 also obtains the second pixel line 94B as a position adjustment line 82C.

The clothing image 60 (the top wear image 32A or the bottom wear image 32B) and a shoe image 90 (the shoe image 32C) that are saved in the database 16 in Step S109 of FIG. 6 are managed via an image table. FIG. 11 shows an example of the image table. Various types of information on the clothing image 60 (the top wear image 32A or the bottom wear image 32B) and the shoe image 90 (the shoe image 32C) that are saved in the database 16 are registered in the image table. The image table is stored in the database 16.

As shown in FIG. 11, the image table includes an "image ID" field, an "item" field, a "URL" field, a "size adjustment line" field, and a "position adjustment line" field. The "image ID field" shows identification information (an image ID) for uniquely identifying an image. The "item" field shows which item is depicted by the image. In the case of an image of an item that has an item ID "T001", for example, the item ID "T001" is registered in the "item" field.

The "URL" field shows information of a link to the image. The "size adjustment line" field shows the position and length of the size adjustment line 80. The "position adjustment line" field shows the position of the position adjustment line 82.

Figure 12:
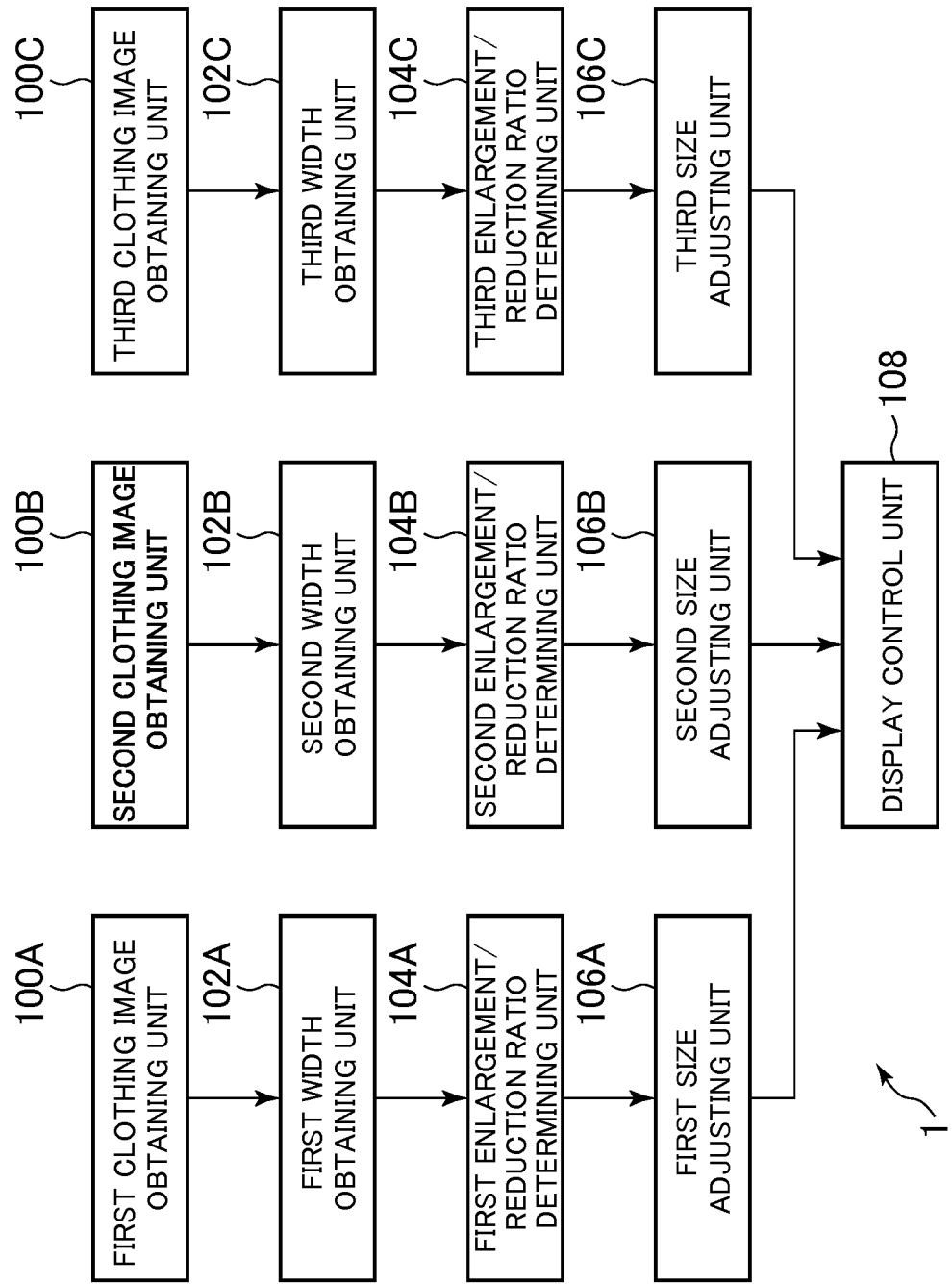
FIG. 12 is a functional block diagram of the electronic commerce system.

Function blocks implemented in the electronic commerce system 1 are described next. FIG. 12 is a functional block diagram illustrating function blocks for displaying the coordinate screen 30 out of the function blocks implemented in the electronic commerce system 1. The function blocks of FIG. 12 are each implemented by the user terminal 20 or the server 10.

Figure 13:
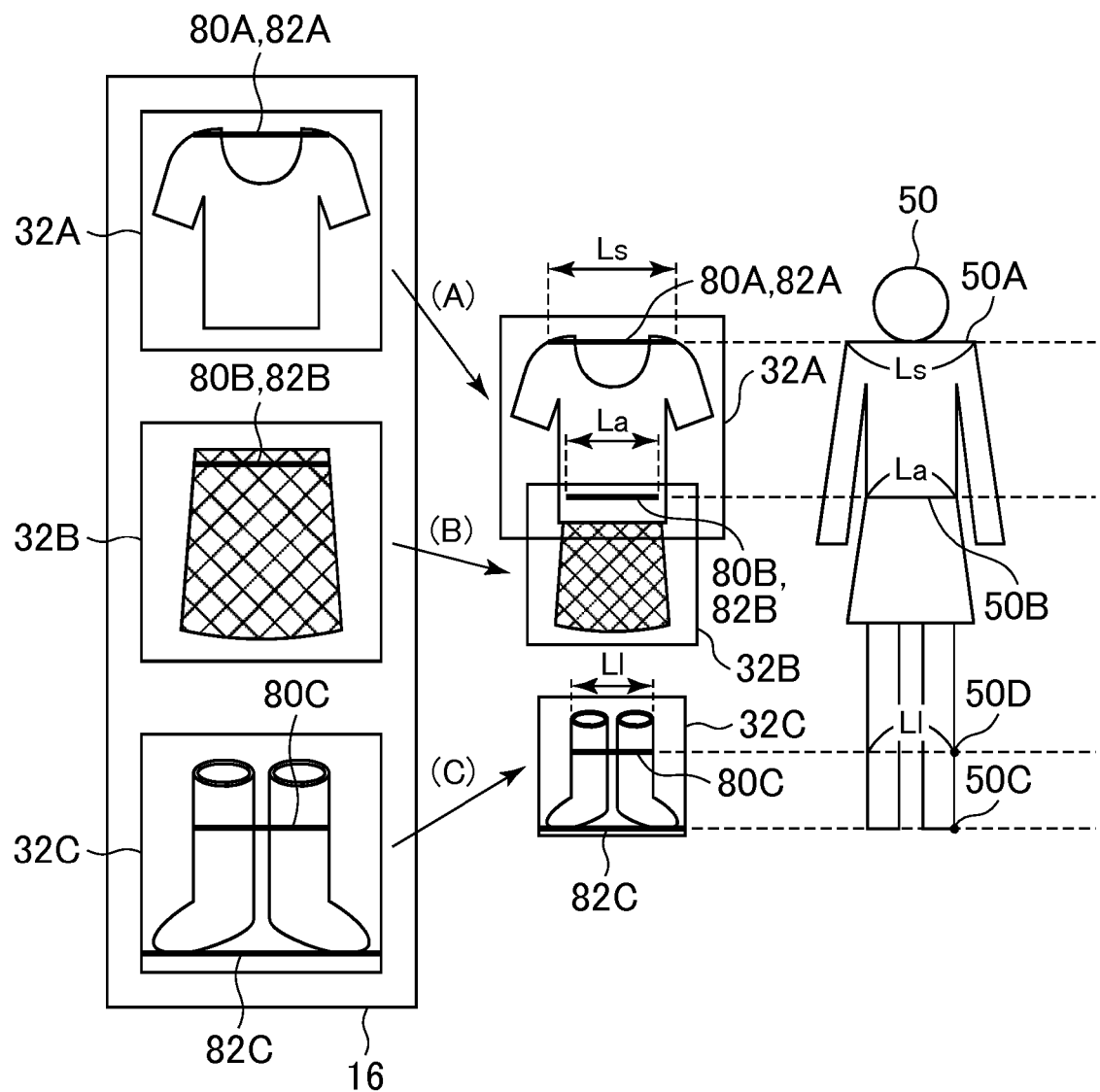
FIG. 13 is a diagram explaining function blocks that are implemented in the electronic commerce system.
Figure 14:
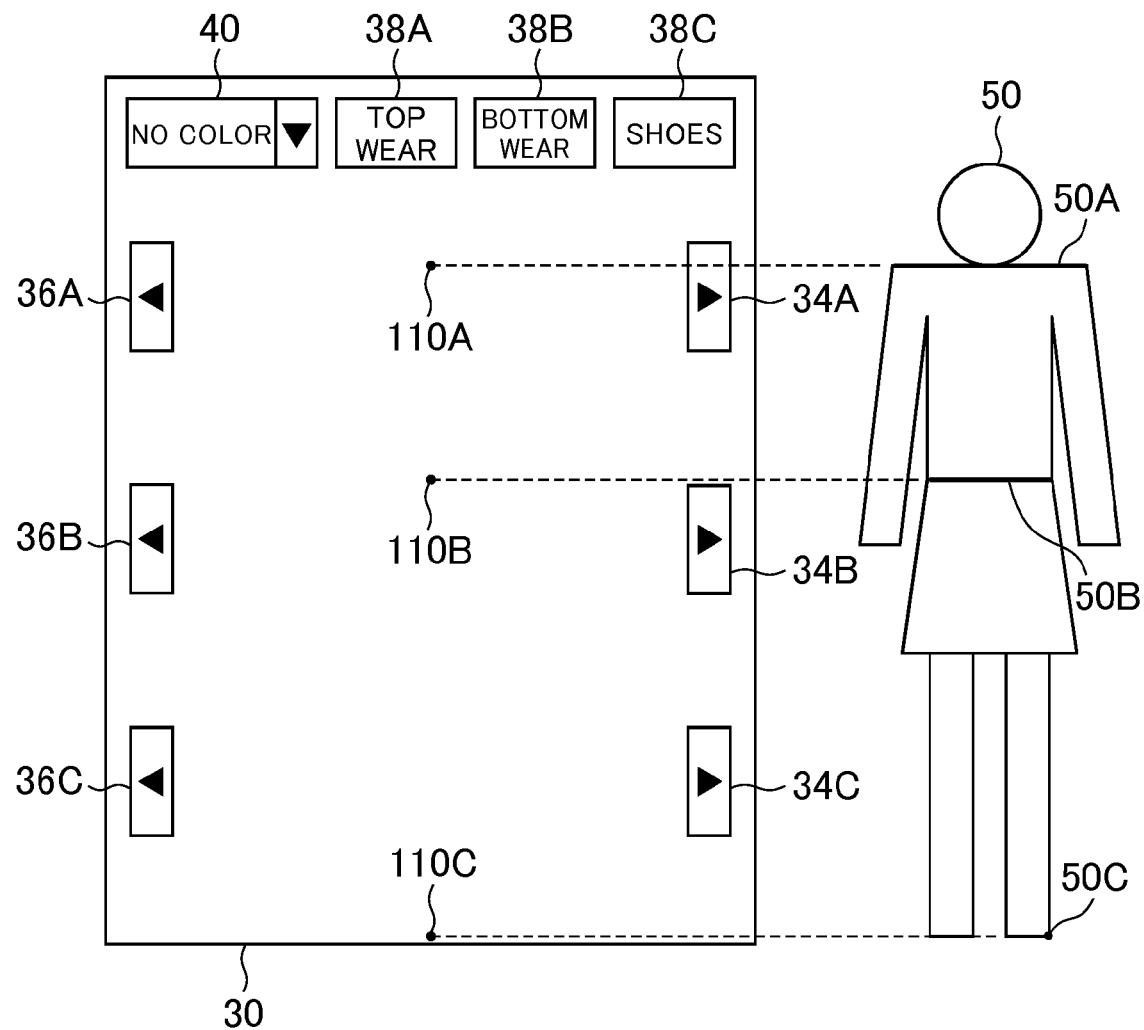
FIG. 14 is a diagram explaining the function blocks that are implemented in the electronic commerce system.

The function blocks of FIG. 12 are described below. FIG. 13 and FIG. 14 are diagrams that explain the function blocks.

As illustrated in FIG. 12, the electronic commerce system 1 includes a first clothing image obtaining unit 100A, a first width obtaining unit 102A, a first enlargement/reduction ratio determining unit 104A, and a first size adjusting unit 106A. These function blocks are components for displaying the top wear image 32A on the coordinate screen 30.

The first clothing image obtaining unit 100A obtains a first clothing image which is an image of a first piece of clothing worn on the upper half of the body. In this embodiment, a top wear corresponds to the "first piece of clothing" and the top wear image 32A corresponds to the "first clothing image". In short, the first clothing image obtaining unit 100A obtains the top wear image 32A.

The first width obtaining unit 102A obtains the width of the shoulder part of the top wear in the top wear image 32A. Specifically, the first width obtaining unit 102A obtains the length of the size adjustment line 80A in the top wear image 32A.

The first enlargement/reduction ratio determining unit 104A determines an enlargement ratio or a reduction ratio for the top wear image 32A based on the degree of difference between the width obtained by the first width obtaining unit 102A and a given first reference length.

In this embodiment, a width (Ls) of the shoulder part 50A of the virtual human body model 50 is set as the "first reference length", and the first enlargement/reduction ratio determining unit 104A obtains an enlargement ratio or a reduction ratio that makes the length of the size adjustment line 80A in the top wear image 32A equal to the first reference length (Ls). Specifically, the first enlargement/reduction ratio determining unit 104A obtains the enlargement ratio or the reduction ratio by dividing the first reference length (Ls) by the length of the size adjustment line 80A in the top wear image 32A.

The first size adjusting unit 106A adjusts the size of the top wear image 32A based on the width obtained by the first width obtaining unit 102A. In other words, the first size adjusting unit 106A adjusts the size of the top wear image 32A based on the length of the size adjustment line 80A in the top wear image 32A.

The first size adjusting unit 106A in this embodiment enlarges or reduces the top wear image 32A based on the enlargement ratio or reduction ratio determined by the first enlargement/reduction ratio determining unit 104A (see an arrow A in FIG. 13).

As illustrated in FIG. 12, the electronic commerce system 1 further includes a second clothing image obtaining unit 100B, a second width obtaining unit 102B, a second enlargement/reduction ratio determining unit 104B, and a second size adjusting unit 106B. These function blocks are components for displaying the bottom wear image 32B on the coordinate screen 30.

The second clothing image obtaining unit 100B obtains a second clothing image which is an image of a second piece of clothing worn on the lower half of the body. In this embodiment, a bottom wear corresponds to the "second piece of clothing" and the bottom wear image 32B corresponds to the "second clothing image". In short, the second clothing image obtaining unit 100B obtains the bottom wear image 32B.

The second width obtaining unit 102B obtains the width of the waist part of the bottom wear in the bottom wear image 32B. Specifically, the second width obtaining unit 102B obtains the length of the size adjustment line 80B in the bottom wear image 32B.

The second enlargement/reduction ratio determining unit 104B determines an enlargement ratio or a reduction ratio for the bottom wear image 32B based on the degree of difference between the width obtained by the second width obtaining unit 102B and a given second reference length.

In this embodiment, a width (La) of the waist part 50B of the virtual human body model 50 as illustrated in FIG. 13 is set as the "second reference length", and the second enlargement/reduction ratio determining unit 104B obtains an enlargement ratio or a reduction ratio that makes the length of the size adjustment line 80B in the bottom wear image 32B equal to the second reference length (La). Specifically, the second enlargement/reduction ratio determining unit 104B obtains the enlargement ratio or the reduction ratio by dividing the second reference length (La) by the length of the size adjustment line 80B in the bottom wear image 32B.

The second size adjusting unit 106B adjusts the size of the bottom wear image 32B based on the width obtained by the second width obtaining unit 102B. In other words, the second size adjusting unit 106B adjusts the size of the bottom wear image 32B based on the length of the size adjustment line 80B in the bottom wear image 32B.

The second size adjusting unit 106B in this embodiment enlarges or reduces the bottom wear image 32B based on the enlargement ratio or reduction ratio determined by the second enlargement/reduction ratio determining unit 104B (see an arrow B in FIG. 13).

As illustrated in FIG. 12, the electronic commerce system 1 further includes a third clothing image obtaining unit 100C, a third width obtaining unit 102C, a third enlargement/reduction ratio determining unit 104C, and a third size adjusting unit 106C. These function blocks are components for displaying the shoe image 32C on the coordinate screen 30.

The third clothing image obtaining unit 100C obtains the shoe image 32C stored in the database 16. The third width obtaining unit 102C obtains the width of the pair of shoes in the shoe image 32C. In other words, the third width obtaining unit 102C obtains the length of the size adjustment line 80C in the shoe image 32C.

The third enlargement/reduction ratio determining unit 104C determines an enlargement ratio or a reduction ratio for the shoe image 32C based on the degree difference between the width obtained by the third width obtaining unit 102C and a given third reference length.

In this embodiment, a width (L1) of a foot part of the virtual human body model 50 as illustrated in FIG. 13 is set as the "third reference length", and the third enlargement/reduction ratio determining unit 104C obtains an enlargement ratio or a reduction ratio that makes the length of the size adjustment line 80C in the shoe image 32C equal to the third reference length (L1). Specifically, the third enlargement/reduction ratio determining unit 104C obtains the enlargement ratio or the reduction ratio by dividing the third reference length (L1) by the length of the size adjustment line 80C in the shoe image 32C.

The third size adjusting unit 106C adjusts the size of the shoe image 32C based on the width obtained by the third width obtaining unit 102C. In other words, the third size adjusting unit 106C adjusts the size of the shoe image 32C based on the length of the size adjustment line 80C in the shoe image 32C.

The third size adjusting unit 106C in this embodiment enlarges or reduces the shoe image 32C based on the enlargement ratio or reduction ratio determined by the third enlargement/reduction ratio determining unit 104C (see an arrow C in FIG. 13).

The electronic commerce system 1 further includes a display control unit 108 as illustrated in FIG. 12. The display control unit 108 displays, on the display unit 25, the coordinate screen 30 for displaying a top wear, a bottom wear, and a pair of shoes on top of one another.

The display control unit 108 displays the coordinate screen 30 on the display unit 25 based on the top wear image 32A that has been adjusted by the first size adjusting unit 106A, the bottom wear image 32B that has been adjusted by the second size adjustment unit 106B, and the shoe image 32C that has been adjusted by the third size adjustment unit 106C.

As illustrated in FIG. 14, a point 110A which corresponds to the shoulder part 50A of the virtual human body model 50 is set in the coordinate screen 30. The display control unit 108 displays, on the coordinate screen 30, the top wear image 32A that has been adjusted by the first size adjusting unit 106A so that the midpoint of the position adjustment line 82A matches the point 110A.

Similarly, a point 110B which corresponds to the waist part 50B of the virtual human body model 50 is set in the coordinate screen 30. The display control unit 108 displays, on the coordinate screen 30, the bottom wear image 32B that has been adjusted by the second size adjusting unit 106B so that the midpoint of the position adjustment line 82B matches the point 110B.

Further, a point 110C which corresponds to the sole part 50C of the virtual human body model 50 (in other words, a surface of the ground) is set in the coordinate screen 30. The display control unit 108 displays, on the coordinate screen 30, the shoe image 32C that has been adjusted by the third size adjusting unit 106C so that the midpoint of the position adjustment line 82C matches the point 110C.

Figure 15:
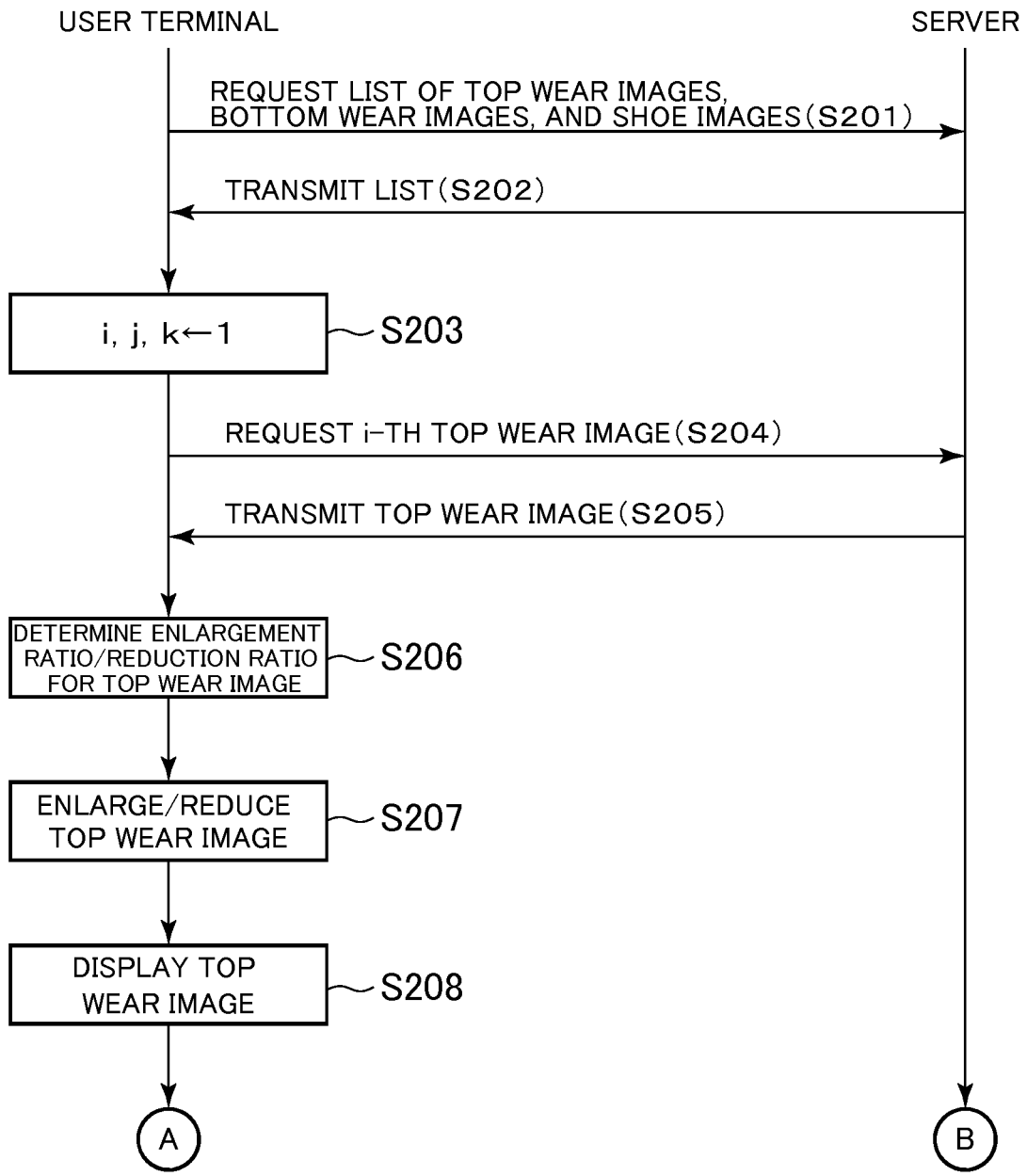
FIG. 15 is a diagram illustrating an example of processing that is executed in the electronic commerce system.
Figure 16:
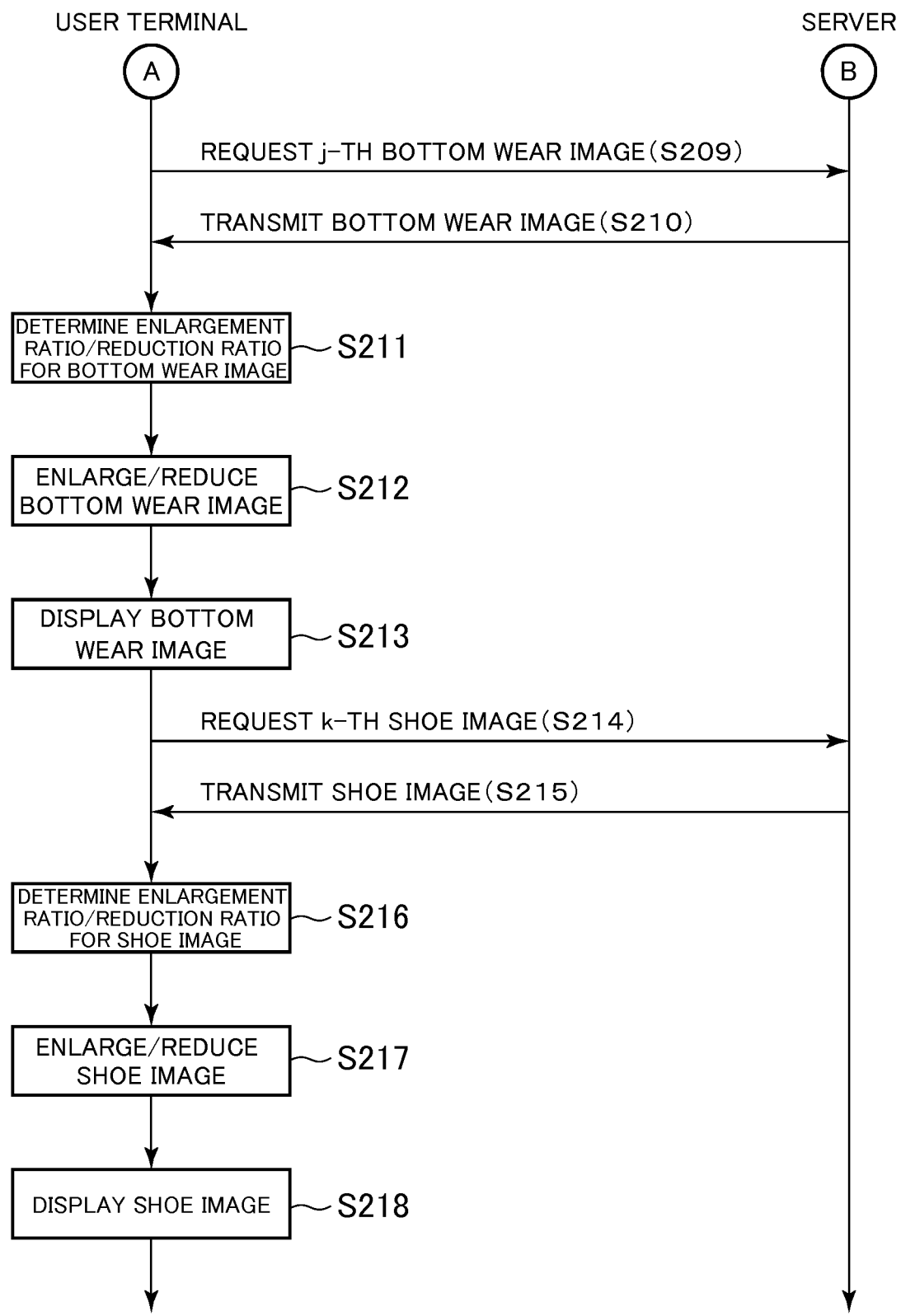
FIG. 16 is a diagram illustrating the example of processing that is executed in the electronic commerce system.

Processing that is executed in the electronic commerce system 1 to start displaying the coordinate screen 30 is described next. FIG. 15 and FIG. 16 are diagrams explaining processing that is executed in the electronic commerce system 1 to start displaying the coordinate screen 30. The control unit 21 of the user terminal 20 (clothing image processing device) executes the processing of FIG. 15 and FIG. 16 according to a program, thus enabling the control unit 21 to function as the function blocks of FIG. 12.

To start displaying the coordinate screen 30, the control unit 21 of the user terminal 20 first requests a list of the top wear images 32A, the bottom wear images 32B, and the shoe images 32C from the server 10 as illustrated in FIG. 15 (S201).

When the server 10 receives the request, the control unit 11 selects a given number of top wear images 32A, a given number of bottom wear images 32B, and a given number of shoe images 32C that are to be displayed on the coordinate screen 30, and returns a list of these top wear images 32A, bottom wear images 32B, and shoe images 32C to the user terminal 20 (S202). In this case, for each of the top wear images 32A, the bottom wear images 32B, and the shoe image 32C that are selected to be displayed on the coordinate screen 30, various types of information registered in the image table are transmitted to the user terminal 20.

When the user terminal 20 receives the list, the control unit 21 initializes variables i, j, and k to 1 (S203). The role of the variable i is to indicate the ordinal number of the top wear image 32A that is being displayed on the coordinate screen 30. Similarly, the variable j indicates the ordinal number of the bottom wear image 32B that is being displayed on the coordinate screen 30, and the variable k indicates the ordinal number of the shoe image 32C that is being displayed on the coordinate screen 30.

Thereafter, the control unit 21 requests the i-th top wear image 32A from the server 10 (S204). The plurality of top wear images 32A selected to be displayed on the coordinate screen 30 are sorted in a given order (for example, in ascending order of image ID). In Step S204, the control unit 21 requests from the server 10 the i-th top wear image 32A out of the plurality of top wear images 32A selected to be displayed on the coordinate screen 30.

When the server 10 receives the request, the control unit 11 transmits the top wear image 32A to the user terminal 20 (S205). When the user terminal 20 receives the top wear image 32A, the control unit 21 determines an enlargement ratio or a reduction ratio for the top wear image 32A (S206). The control unit 21 obtains the enlargement ratio or the reduction ratio by dividing the first reference length (Ls) by the length of the size adjustment line 80A of the top wear image 32A.

The control unit 21 enlarges or reduces the top wear image 32A according to the enlargement ratio or reduction ratio determined in Step S206 (S207), and displays the top wear image 32A that has been enlarged or reduced on the coordinate screen 30 (S208).

In this step, the display position of the top wear image 32A is set so that the midpoint of the position adjustment line 82A of the top wear image 32A matches the point 110A which corresponds to the shoulder part 50A of the virtual human body model 50.

Thereafter, the control unit 21 requests from the server 10 the j-th bottom wear image 32B out of the plurality of bottom wear images 32B selected to be displayed on the coordinate screen 30 (S209). When the server 10 receives the request, the control unit 11 transmits the requested bottom wear image 32B to the user terminal (S210).

When the user terminal 20 receives the bottom wear image 32B, the control unit 21 determines an enlargement ratio or a reduction ratio for the bottom wear image 32B (S211). The control unit 21 obtains the enlargement ratio or the reduction ratio by dividing the second reference length (La) by the length of the size adjustment line 80B of the bottom wear image 32B.

The control unit 21 enlarges or reduces the bottom wear image 32B according to the enlargement ratio or reduction ratio determined in Step S211 (S212), and displays the bottom wear image 32B that has been enlarged or reduced on the coordinate screen 30 (S213).

In this step, the display position of the bottom wear image 32B is set so that the midpoint of the position adjustment line 82B of the bottom wear image 32B matches the point 110B which corresponds to the waist part 50B of the virtual human body model 50.

Thereafter, the control unit 21 requests from the server 10 the k-th shoe image 32C out of the plurality of shoe images 32C selected to be displayed on the coordinate screen 30 (S214). When the server 10 receives the request, the control unit 11 transmits the requested shoe image 32C to the user terminal 20 (S215).

When the user terminal 20 receives the shoe image 32C, the control unit 21 determines an enlargement ratio or a reduction ratio for the bottom image 32C (S216). The control unit 21 obtains the enlargement ratio or the reduction ratio by dividing the third reference length (Ll) by the length of the size adjustment line 80C of the shoe image 32C.

The control unit 21 enlarges or reduces the shoe image 32C according to the enlargement ratio or reduction ratio determined in Step S216 (S217), and displays the shoe image 32C that has been enlarged or reduced on the coordinate screen 30 (S218).

In this step, the display position of the shoe image 32C is set so that the midpoint of the position adjustment line 82C of the shoe image 32C matches the point 110C which corresponds to the sole part 50C of the virtual human body model 50 (the surface of the ground). This concludes the description about processing that is executed to start displaying the coordinate screen 30.

In the case where the forward button 34A is pressed while the coordinate screen 30 is displayed, the value of the variable i is incremented and then the same processing as steps S204 to S208 is executed. Similarly, in the case where the back button 36A is pressed, the value of the variable i is decremented and then the same processing as Steps S204 to S208 is executed.

Similarly, in the case where the forward button 34B or the back button 36B is pressed, the value of the variable j is incremented or decremented and then the same processing as Steps S209 to S213 is executed. In the case where the forward button 34C or the back button 36C is pressed, the value of the variable k is incremented or decremented and then the same processing as Steps S214 to S218 is executed.

In the case where the top wear button 38A is pressed, the value of the variable i is incremented at given time intervals (e.g., 2-second intervals). Each time the value of the variable i is incremented, the same processing as Steps S204 to S208 is executed repeatedly.

Similarly, in the case where the bottom wear button 38B is pressed, the value of the variable j is incremented at given time intervals (e.g., 2-second intervals). Each time the value of the variable j is incremented, the same processing as Steps S209 to S213 is executed repeatedly.

In the case where the shoes button 38C is pressed, the value of the variable k is incremented at given time intervals (e.g., 2-second intervals). Each time the value of the variable k is incremented, the same processing as Steps S214 to S218 is executed repeatedly.

The electronic commerce system 1 (clothing image processing system) according to this embodiment which has been described automatically adjusts the respective sizes of the top wear image 32A, the bottom wear image 32B, and the shoe image 32C according to the virtual human body model 50 (the arrows A, B, and C of FIG. 13) and, as a result, the top wear image 32A, the bottom wear image 32B, and the shoe image 32C are displayed in a balance that is close to the balance of the actual sizes of the top wear, the bottom wear, and the pair of shoes.

It could be also considered that an operator of the electronic commerce system or others generates clothing images adjusted to the body shape of a mannequin or an avatar by performing image size adjustment and trimming while checking photographed images of top wears, bottom wears, or pairs of shoes one by one, in order to display the top wear image 32A, the bottom wear image 32B, and the shoe image 32C in a balance close to the balance of the actual sizes of the top wear, the bottom wear, and the pair of shoes. However, such work is very laborious and increases working hours and cost. Further, it could be also considered that clothing images in which the same piece of clothing is photographed from a plurality of angles are prepared, but this increases working hours and cost. The electronic commerce system 1 according to this embodiment can keep working hours short and cost low.

The electronic commerce system 1 according to this embodiment is also capable of changing the size of the virtual human body model 50 according to the user's gender, age, or body shape. Even when the size of the virtual human body model 50 is changed, the electronic commerce system 1 according to this embodiment can easily adjust the respective sizes of the top wear image 32A, the bottom wear image 32B, and the shoe image 32C according to the changed virtual human body model 50.

The present invention is not limited to the embodiment described above.

Figure 17:
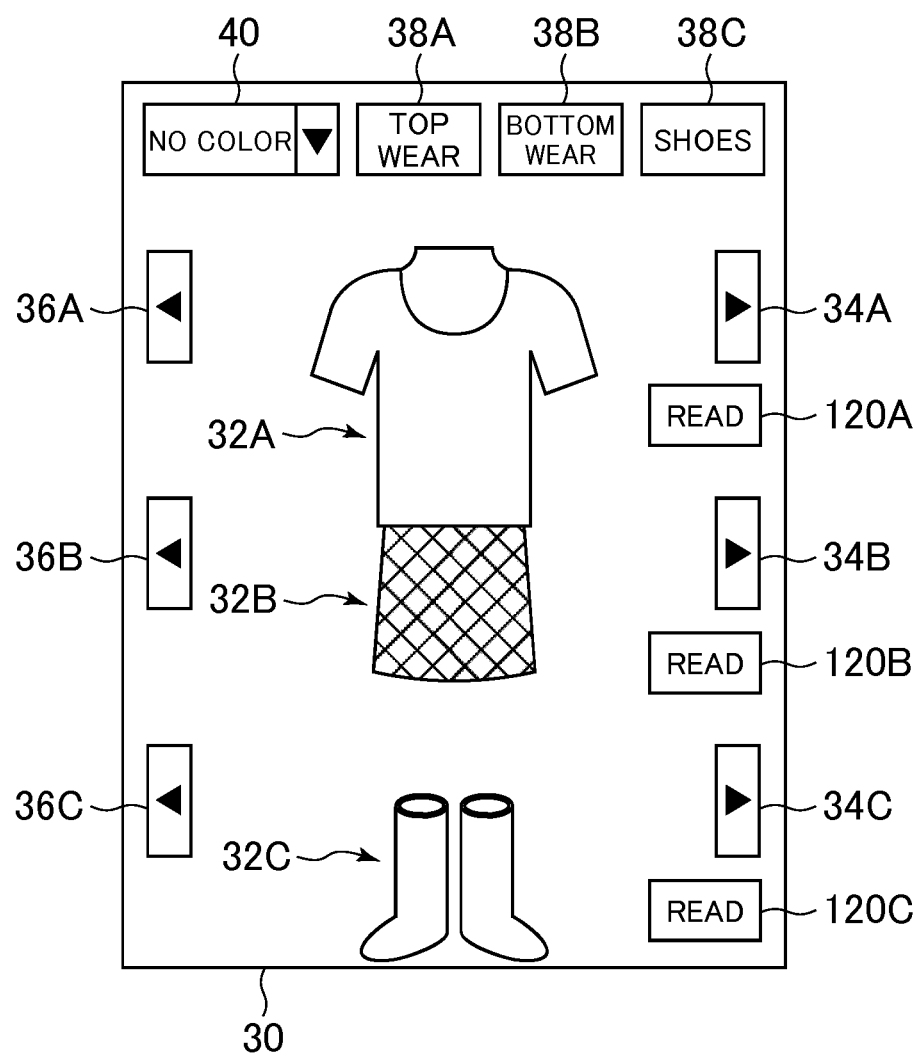
FIG. 17 is a diagram illustrating another example of the coordinate screen.

[1] FIG. 17 illustrates another example of the coordinate screen 30. The coordinate screen 30 of FIG. 17 differs from the coordinate screen 30 of FIG. 4 in that read buttons 120A, 120B, and 120C are included.

The read button 120A is a button for displaying on the coordinate screen 30 a top wear image that is, for example, photographed by the user or obtained by the user from a Web page or other places. The press of the read button 120A causes the display unit 25 to display a selection screen (not shown) for selecting a top wear image.

For instance, the user takes a picture of a top wear that the user owns in advance and selects the photographed image on the selection screen. An image selected on the selection screen is transmitted to the server 10. The server 10 in this case executes the processing of FIG. 6 for the received image. After the processing of FIG. 6 is completed, the image is returned to the user terminal 20. Then the user terminal 20 executes the same processing as Steps S206 to S208 of FIG. 15. As a result, the top wear owned by the user is displayed on the coordinate screen 30.

Alternatively, a photographing screen for taking a picture may be displayed when the read button 120A is pressed. An image taken on the photographing screen is transmitted to the server 10.

The read button 120B is a button for displaying on the coordinate screen 30 a bottom wear image that is photographed by the user or obtained by the user from a Web page or other places. The read button 120C is a button for displaying on the coordinate screen 30 a shoe image that is photographed by the user or obtained by the user from a Web page or other places.

In this way, the user can check how well an item coordinates with, for example, the user's clothes.

Figure 18:
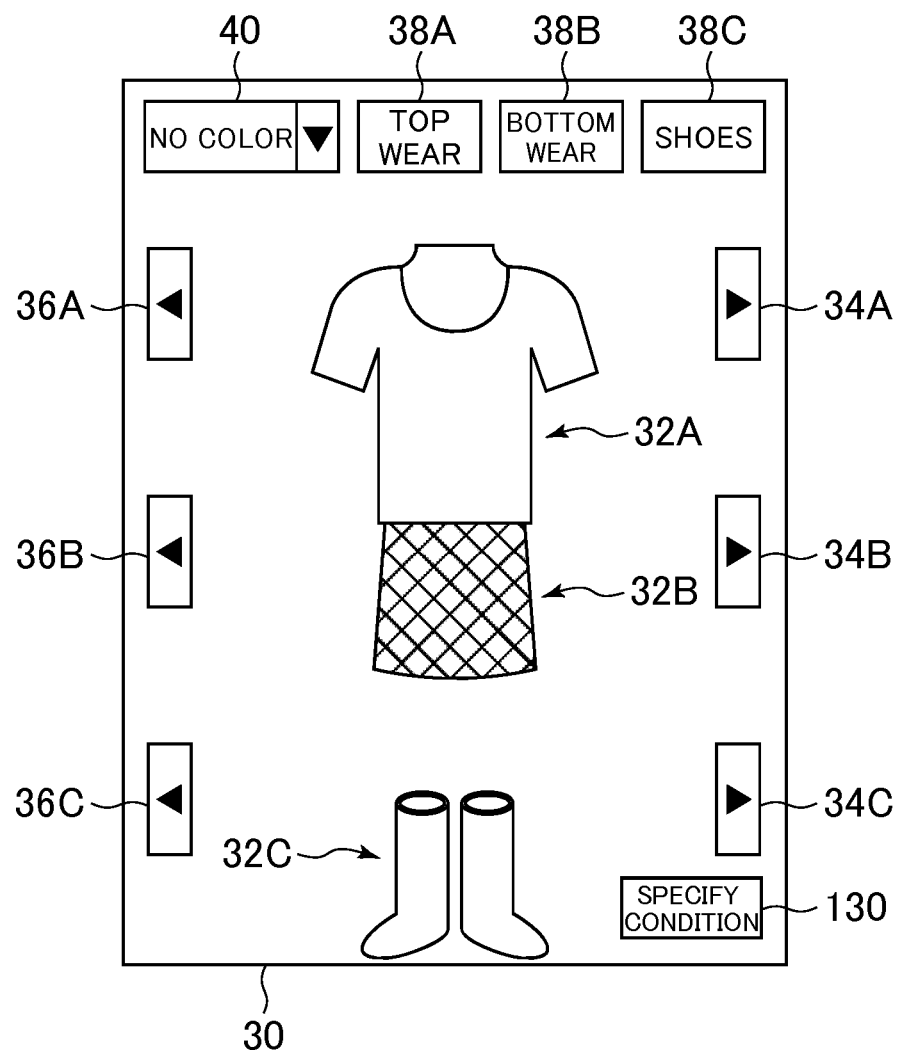
FIG. 18 is a diagram illustrating still another example of the coordinate screen.

[2] FIG. 18 illustrates still another example of the coordinate screen 30. The coordinate screen 30 of FIG. 18 differs from the coordinate screens 30 of FIG. 4 and FIG. 17 in that a "specify condition" button 130 is included.

The "specify condition" button 130 is a button for specifying conditions about top wears, bottom wears, and pairs of shoes to be displayed on the coordinate screen 30.

Figure 19:
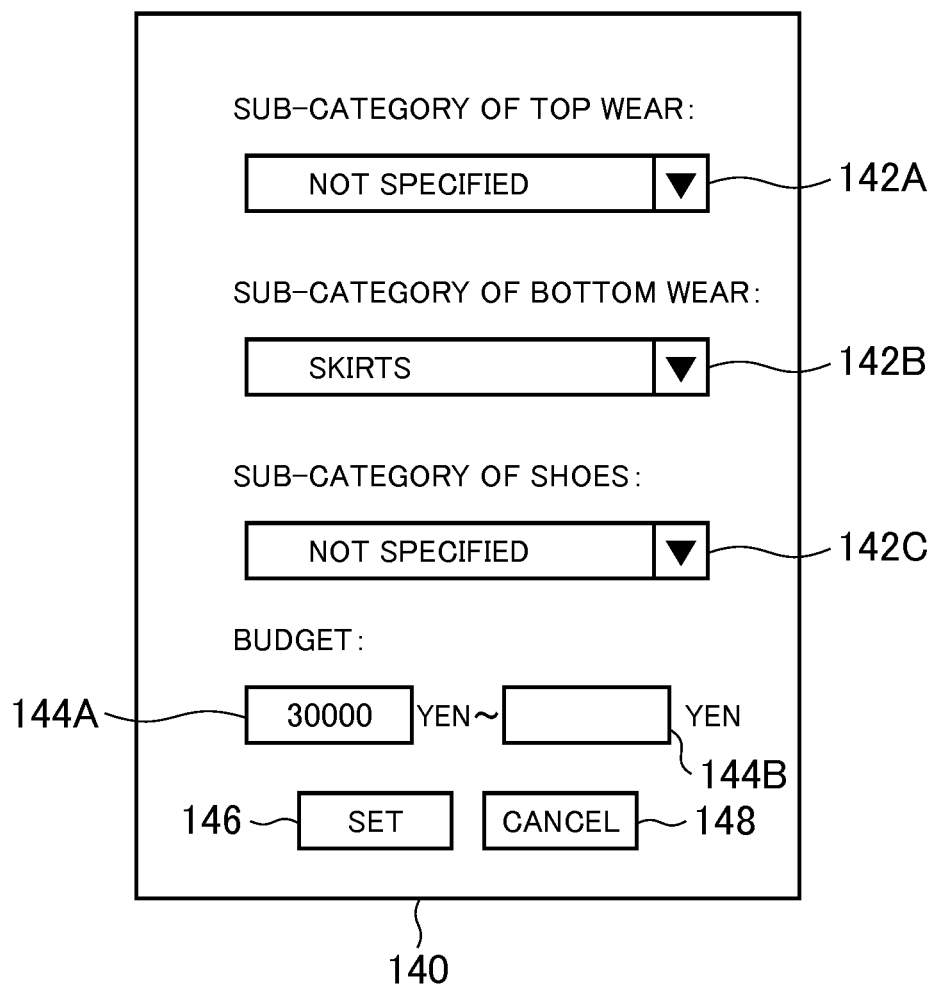
FIG. 19 is a diagram illustrating an example of a condition specifying screen.

A condition specifying screen is displayed when the "specify condition" button 130 is pressed. FIG. 19 illustrates an example of the condition specifying screen. The condition specifying screen 140 is a screen for receiving the specification of conditions about top wear images, bottom wear images, and shoe images to be displayed on the coordinate screen 30.

The condition specifying screen 140 includes selection fields 142A, 142B, and 142C as illustrated in FIG. 19. The selection field 142A is for receiving the specification of a sub-category of top wears to be displayed on the coordinate screen 30. When a sub-category is selected in the selection field 142A, the top wear image 32A that is displayed on the coordinate screen 30 is limited to images of top wears that belong to the selected sub-category.

The selection field 142B is for receiving the specification of a sub-category of bottom wears to be displayed on the coordinate screen 30. When a sub-category is selected in the selection field 142B, the bottom wear image 32B that is displayed on the coordinate screen 30 is limited to images of bottom wears that belong to the selected sub-category.

The selection field 142C is for receiving the specification of a sub-category of pairs of shoes to be displayed on the coordinate screen 30. When a sub-category is selected in the selection field 142C, the shoe image 32C that is displayed on the coordinate screen 30 is limited to images of pairs of shoes that belong to the selected sub-category.

The condition specifying screen 140 also includes budget fields 144A and 144B. The budget field 144A is for receiving the specification of a lower limit to budget, and the budget field 144B is for receiving the specification of an upper limit to budget.

When an amount of money is input in the budget field 144A, a combination of a top wear, a bottom wear, and a pair of shoes whose total price is equal to or more than the amount of money input in the budget field 144A is displayed on the coordinate screen 30.

When an amount of money is input in the budget field 144B, on the other hand, a combination of a top wear, a bottom wear, and a pair of shoes whose total price is equal to or less than the amount of money input in the budget field 144B is displayed on the coordinate screen 30.

The condition specifying screen 140 also includes a set button 146 and a cancel button 148. The press of the cancel button 148 returns the screen to the coordinate screen 30.

When the set button 146 is pressed, conditions specified on the condition specifying screen 140 are transmitted to the server 10. The server 10 in this case searches for pieces of clothing and pairs of shoes that satisfy the conditions, and transmits a list of the top wear images 32A, the bottom wear images 32B, and the shoe images 32C of the found clothing and shoes to the user terminal 20. The user terminal 20 displays the coordinate screen 30 based on the list.

In this way, the user can specify coordinate conditions.

[3] Only a coordinate of a top wear and a bottom wear may be displayed on the coordinate screen 30. In other words, the shoe image 32C and objects related to the shoe image 32C (the shoes button 38C and the like) may not be displayed on the coordinate screen 30. In this case, the third clothing image obtaining unit 100C, the third width obtaining unit 102C, the third enlargement/reduction ratio determining unit 104C, and the third size adjusting unit 106C can be omitted.

The invention claimed is:

1. A clothing image processing system, comprising:
a processor; and
a memory device that stores a plurality of instructions, which when executed by the processor, causes the processor to:
obtain a clothing image;
obtain, for each of a plurality of pixel lines in the clothing image, a number of pixels that are included in an area where clothing is shown; and
specify, based on a frequency of the number of pixels with respect to the plurality of pixel lines, a pixel line that corresponds to a shoulder part or a waist part of the clothing from among the plurality of pixel lines in order to enlarge or reduce the clothing image based on a degree of difference between a width of the clothing along the pixel line that corresponds to the shoulder part or the waist part and a given reference length, and display the enlarged or reduced clothing image on a display unit,
wherein the plurality of instructions causes the processor to:
obtain a first clothing image, which is an image of a first piece of clothing worn on an upper half of a body;
obtain, for each of a plurality of pixel lines in the first clothing image, a number of pixels that are included in an area where the first piece of clothing is shown; and
specify a pixel line that corresponds to the shoulder part from among the plurality of pixel lines in the first clothing image, based on a frequency of the number of pixels with respect to the plurality of pixel lines in the first clothing image
wherein the plurality of instructions causes the processor to:
obtain a second clothing image which is an image of a second piece of clothing worn on a lower half of the body;
obtain, as a width of a shoulder part of the first piece of clothing in the first clothing image, a width of the first piece of clothing along the pixel line that corresponds to the shoulder part;
adjust a size of the first clothing image based on the width of the shoulder part;
obtain a width of a waist part of the second piece of clothing in the second clothing image;
adjust a size of the second clothing image based on the width of the waist part; and
cause the display unit to display a screen on which the first piece of clothing and the second piece of clothing are displayed so that they are vertically lined up, based on the first clothing image that has been adjusted and the second clothing image that has been adjusted.

2. The clothing image processing system according to claim 1,
wherein the plurality of instructions causes the processor to specify a pixel line that corresponds to the shoulder part or the waist part, based on a change of a curvature in the frequency.

3. The clothing image processing system according to claim 2,
wherein the plurality of instructions causes the processor to specify, as the pixel line that corresponds to the shoulder part or the waist part, a pixel line where a change in the curvature that exceeds a given value is first found in the case of examining a change in the curvature from a top of the clothing image in order.

4. The clothing image processing system according to claim 1,
wherein the plurality of instructions causes the processor to:
obtain a second clothing image which is an image of a second piece of clothing worn on a lower half of a body;
obtain, for each of a plurality of pixel lines in the second clothing image, a number of pixels that are included in an area where the second piece of clothing is shown; and
specify a pixel line that corresponds to the waist part from among the plurality of pixel lines in the second clothing image, based on a frequency of the number of pixels with respect to the plurality of pixel lines in the second clothing image.

5. The clothing image processing system according to claim 4,
wherein the plurality of instructions causes the processor to:
obtain a first clothing image which is an image of a first piece of clothing worn on an upper half of the body;
obtain a width of a shoulder part of the first piece of clothing in the first clothing image;
adjust a size of the first clothing image based on the width obtained by the first width obtaining unit;
obtain, as a width of a waist part of the second piece of clothing in the second clothing image, a width of the second piece of clothing along the pixel line that corresponds to the waist part;
adjust a size of the second clothing image based on the width of the waist part; and
cause the display unit to display a screen on which the first piece of clothing and the second piece of clothing are displayed so that they are vertically lined up, based on the first clothing image that has been adjusted and the second clothing image that has been adjusted.

6. The clothing image processing system according to claim 1,
wherein the plurality of instructions causes the processor to:
obtain a first clothing image, which is an image of a first piece of clothing worn on an upper half of a body; and
obtain a second clothing image which is an image of a second piece of clothing worn on a lower half of the body, and
wherein the plurality of instructions further causes the processor to:
obtain a width of a shoulder part of the first piece of clothing in the first clothing image;
adjust a size of the first clothing image based on the width of the shoulder part;
obtain a width of a waist part of the second piece of clothing in the second clothing image;
adjust a size of the second clothing image based on the width of the waist part; and
cause the display unit to display a screen on which the first piece of clothing and the second piece of clothing are displayed so that they are vertically lined up, based on the first clothing image that has been adjusted and the second clothing image that has been adjusted.

7. The clothing image processing system according to claim 6,
wherein the plurality of instructions further causes the processor to:
determine an enlargement ratio or a reduction ratio for the first clothing image, based on a degree of difference between the width of the shoulder part and a given first reference length,
enlarge or reduce the first clothing image based on the determined enlargement ratio or reduction ratio.

8. The clothing image processing system according to claim 6,
wherein the plurality of instructions further causes the processor to:
determine an enlargement ratio or a reduction ratio for the second clothing image, based on a degree of difference between the width of the waist part and a given second reference length,
enlarge or reduce the second clothing image based on the determined enlargement ratio or reduction ratio.

9. The clothing image processing system according to claim 6,
wherein the plurality of instructions causes the processor to cause the display unit to display the screen on which the first piece of clothing and the second piece of clothing are displayed in a positional relation that corresponds to a positional relation between shoulders and a waist of a person, based on the first clothing image that has been adjusted and the second clothing image that has been adjusted.

10. The clothing image processing system according to claim 6,
wherein the plurality of instructions causes the processor to:
determine, on the screen on which the first piece of clothing and the second piece of clothing are displayed so that they have a positional relationship that corresponds to a positional relationship of a shoulder part and a waist part of a person, a vertical display position of the first clothing image based on a pixel line that corresponds to the shoulder part; and
determine, on the screen on which the first piece of clothing and the second piece of clothing are displayed so that they have a positional relationship that corresponds to a positional relationship of a shoulder part and a waist part of a person, a vertical display position of the second clothing image based on a pixel line that corresponds to the waist part.

11. The clothing image processing system according to claim 6,
wherein the plurality of instructions causes the processor to:
receive a specification of a category of pieces of clothing worn on the upper half of the body;
receive a specification of a category of pieces of clothing worn on the lower half of the body;

cause the display unit, in a case where the specification of the category of pieces of clothing worn on the upper half of the body is received, to display the screen on which the first piece of clothing that belongs to the specified category is displayed, based on the first clothing image that has been adjusted; and cause the display unit, in a case where the specification of the category of pieces of clothing worn on the lower half of the body is received, to display the screen on which the second piece of clothing that belongs to the specified category is displayed, based on the second clothing image that has been adjusted.

12. The clothing image processing system according to claim 6,
wherein the plurality of instructions causes the processor to:
obtain, as the first clothing image, an image of a piece of clothing worn on the upper half of the body that is photographed or specified by a user, and
obtain, as the second clothing image, an image of a piece of clothing worn on the lower half of the body that is photographed or specified by the user.

13. The clothing image processing system according to claim 6,
wherein the plurality of instructions further causes the processor to:
obtain a shoe image;
obtain, as a width of a pair of shoes in the shoe image, a width of the pair of shoes along a pixel line that is placed below an uppermost part of the shoes at a distance obtained by multiplying a height of the shoes by a given coefficient α (0<α<1); and
adjust a size of the shoe image based on the width of the pair of shoes.

14. The clothing image processing system according to claim 13,
wherein the plurality of instructions causes the processor to:
determine an enlargement ratio or a reduction ratio for the shoe image, based on a degree of difference between the width of the pair of shoes and a given third reference length; and
enlarge or reduce the shoe image based on the determined enlargement ratio or reduction ratio.

15. The clothing image processing system according to claim 13, wherein the plurality of instructions causes the processor to cause the display unit to display the screen on which the first piece of clothing, the second piece of clothing, and the pair of shoes are displayed so that they are vertically lined up, based on the first clothing image that has been adjusted, the second clothing image that has been adjusted, and the shoe image that has been adjusted.

16. The clothing image processing system according to claim 15,
wherein the plurality of instructions causes the processor to cause the display unit to display the screen on which the first piece of clothing, the second piece of clothing, and the pair of shoes are displayed so that they have a positional relation that corresponds to a positional relation between shoulders, a waist, and feet of a person, based on the first clothing image that has been adjusted, the second clothing image that has been adjusted, and the shoe image that has been adjusted.

17. The clothing image processing system according to claim 1,
wherein the plurality of instructions further causes the processor to:
specify a background area in the clothing image; and
remove the background area from the clothing image,
wherein the specifying comprises:
setting, as the background area, pixel lines adjacent to four sides of the clothing image;
determining whether or not an adjacent pixel, which is adjacent to a pixel in the background area, has a color that is identical or similar to a color of the pixel in the background area; and
expanding the background area by adding the adjacent pixel to the background area in a case where the adjacent pixel has the color that is identical or similar to the color of the pixel in the background area.

18. A clothing image processing method, comprising:
obtaining a clothing image;
obtaining, for each of a plurality of pixel lines in the clothing image, a number of pixels that are included in an area where clothing is shown; and
specifying, based on a frequency of the number of pixels with respect to the plurality of pixel lines, a pixel line that corresponds to a shoulder part or a waist part of the clothing from among the plurality of pixel lines in order to enlarge or reduce the clothing image based on a degree of difference between a width of the clothing along the pixel line that corresponds to the shoulder part or the waist part and a given reference length and display the enlarged or reduced clothing image on a display unit;
wherein the obtaining a clothing image comprises:
obtaining a first clothing image, which is an image of a first piece of clothing worn on an upper half of a body;
wherein the obtaining a number of pixels comprises:
obtaining, for each of a plurality of pixel lines in the first clothing image, a number of pixels that are included in an area where the first piece of clothing is shown; and
wherein the specifying comprises:
specifying a pixel line that corresponds to the shoulder part from among the plurality of pixel lines in the first clothing image, based on a frequency of the number of pixels with respect to the plurality of pixel lines in the first clothing image,
wherein the clothing image processing method further comprises:
obtaining a second clothing image which is an image of a second piece of clothing worn on a lower half of the body;
obtaining, as a width of a shoulder part of the first piece of clothing in the first clothing image, a width of the first piece of clothing along the pixel line that corresponds to the shoulder part;
adjusting a size of the first clothing image based on the width of the shoulder part;
obtaining a width of a waist part of the second piece of clothing in the second clothing image;
adjusting a size of the second clothing image based on the width of the waist part; and
causing the display unit to display a screen on which the first piece of clothing and the second piece of clothing are displayed so that they are vertically lined up, based on the first clothing image that has been adjusted and the second clothing image that has been adjusted.

* * * * *